US012795444B2

(12) United States Patent
Doshi et al.

(10) Patent No.: US 12,795,444 B2
(45) Date of Patent: Nov. 10, 2026

(54) TRAFFIC-TO-PILOT RATIO SIGNALING FOR CONTROL CHANNELS

(71) Applicant: QUALCOMM Incorporated, San Diego, CA (US)

(72) Inventors: Akash Sandeep Doshi, San Diego, CA (US); Wei Yang, San Diego, CA (US); June Namgoong, San Diego, CA (US); Pinar Sen, San Diego, CA (US); Kirill Ivanov, La Jolla, CA (US); Taesang Yoo, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 18/742,655

(22) Filed: Jun. 13, 2024

(65) Prior Publication Data

US 2025/0386241 A1 Dec. 18, 2025

(51) Int. Cl.

| | |
|---|---|
| ***H04W 28/06*** | (2009.01) |
| ***H04L 5/00*** | (2006.01) |
| ***H04W 28/02*** | (2009.01) |

(52) U.S. Cl.
CPC ........... *H04W 28/06* (2013.01); *H04L 5/0048* (2013.01); *H04W 28/0252* (2013.01)

(58) Field of Classification Search
CPC . H04W 28/06; H04W 28/0252; H04W 52/16; H04L 5/0048
See application file for complete search history.

(56) References Cited

U.S. PATENT DOCUMENTS

| | | | | |
|---|---|---|---|---|
| 8,285,318 | B2 | 10/2012 | Chen et al. | |
| 2008/0310541 | A1 | 12/2008 | Kim | |
| 2013/0044697 | A1 * | 2/2013 | Yoo .................... | H04W 72/541 370/328 |
| 2016/0119096 | A1 * | 4/2016 | Sun ...................... | H04B 17/318 370/329 |
| 2016/0127153 | A1 * | 5/2016 | Jiang .................. | H04L 25/0226 370/252 |

OTHER PUBLICATIONS

International Search Report and Written Opinion—PCT/US2025/029792—ISA/EPO—Sep. 11, 2025.

* cited by examiner

*Primary Examiner* — Mohammad S Anwar
(74) *Attorney, Agent, or Firm* — Harrity & Harrity, LLP

(57) ABSTRACT

In some implementations, a first network entity may transmit, to a second network entity, first information indicative of an average traffic-to-pilot ratio (TPR) for a first set of one or more control channel communications. The first network entity may scale, based on the first information, one or more codeword powers associated with a codebook to generate one or more scaled codeword powers. The first network entity may communicate, with the second network entity and using the one or more scaled codeword powers, a second set of one or more control channel communications.

30 Claims, 11 Drawing Sheets

TRAFFIC-TO-PILOT RATIO SIGNALING FOR CONTROL CHANNELS

FIELD OF THE DISCLOSURE

Aspects of the present disclosure generally relate to wireless communication and specifically relate to techniques, apparatuses, and methods associated with traffic-to-pilot ratio signaling for control channels.

INTRODUCTION

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

In some aspects, a first network entity includes a processing system configured to: transmit, to a second network entity, first information indicative of an average traffic-to-pilot ratio (TPR) for a first set of one or more control channel communications; scale, based on the first information, one or more codeword powers associated with a codebook to generate one or more scaled codeword powers; and communicate, with the second network entity and using the one or more scaled codeword powers, a second set of one or more control channel communications.

In some aspects, a first network entity for wireless communication includes a processing system configured to: receive, from a second network entity, first information indicative of an average TPR for a first set of one or more control channel communications; scale, based on the first information, one or more codework powers associated with a codebook to generate one or more scaled codeword powers; and communicate, with the second network entity and using the one or more scaled codeword powers, a second set of one or more control channel communications.

In some aspects, a method of wireless communication performed by a first network entity includes transmitting, to a second network entity, first information indicative of an average TPR for a first set of one or more control channel communications; scaling, based on the first information, one or more codeword powers associated with a codebook to generate one or more scaled codeword powers; and communicating, with the second network entity and using the one or more scaled codeword powers, a second set of one or more control channel communications.

In some aspects, a method of wireless communication performed by a first network entity includes receiving, from a second network entity, first information indicative of an average TPR for a first set of one or more control channel communications; scaling, based on the first information, one or more codework powers associated with a codebook to generate one or more scaled codeword powers; and communicating, with the second network entity and using the one or more scaled codeword powers, a second set of one or more control channel communications.

In some aspects, a non-transitory computer-readable medium having instructions for wireless communication stored thereon that, when executed by a first network entity, cause the first network entity to: transmit, to a second network entity, first information indicative of an average TPR for a first set of one or more control channel communications; scale, based on the first information, one or more codeword powers associated with a codebook to generate one or more scaled codeword powers; and communicate, with the second network entity and using the one or more scaled codeword powers, a second set of one or more control channel communications.

In some aspects, a non-transitory computer-readable medium having instructions for wireless communication stored thereon that, when executed by a first network entity, cause the first network entity to: receive, from a second network entity, first information indicative of an average TPR for a first set of one or more control channel communications; scale, based on the first information, one or more codework powers associated with a codebook to generate one or more scaled codeword powers; and communicate, with the second network entity and using the one or more scaled codeword powers, a second set of one or more control channel communications.

In some aspects, a first apparatus for wireless communication includes means for transmitting, to a second apparatus, first information indicative of an TPR for a first set of one or more control channel communications; means for scaling, based on the first information, one or more codeword powers associated with a codebook to generate one or more scaled codeword powers; and means for communicating, with the second apparatus and using the one or more scaled codeword powers, a second set of one or more control channel communications.

In some aspects, a first apparatus for wireless communication includes means for receiving, from a second apparatus, first information indicative of an average TPR for a first set of one or more control channel communications; means for scaling, based on the first information, one or more codework powers associated with a codebook to generate one or more scaled codeword powers; and means for communicating, with the second apparatus and using the one or more scaled codeword powers, a second set of one or more control channel communications.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing broadly outlines example features and example technical advantages of examples according to the disclosure. Additional example features and example advantages are described hereinafter.

BRIEF DESCRIPTION OF THE DRAWINGS

The appended drawings illustrate certain example aspects of this disclosure and are therefore not limiting in scope. The same reference numbers in different drawings may identify the same or similar elements.

DETAILED DESCRIPTION

Figure 1:
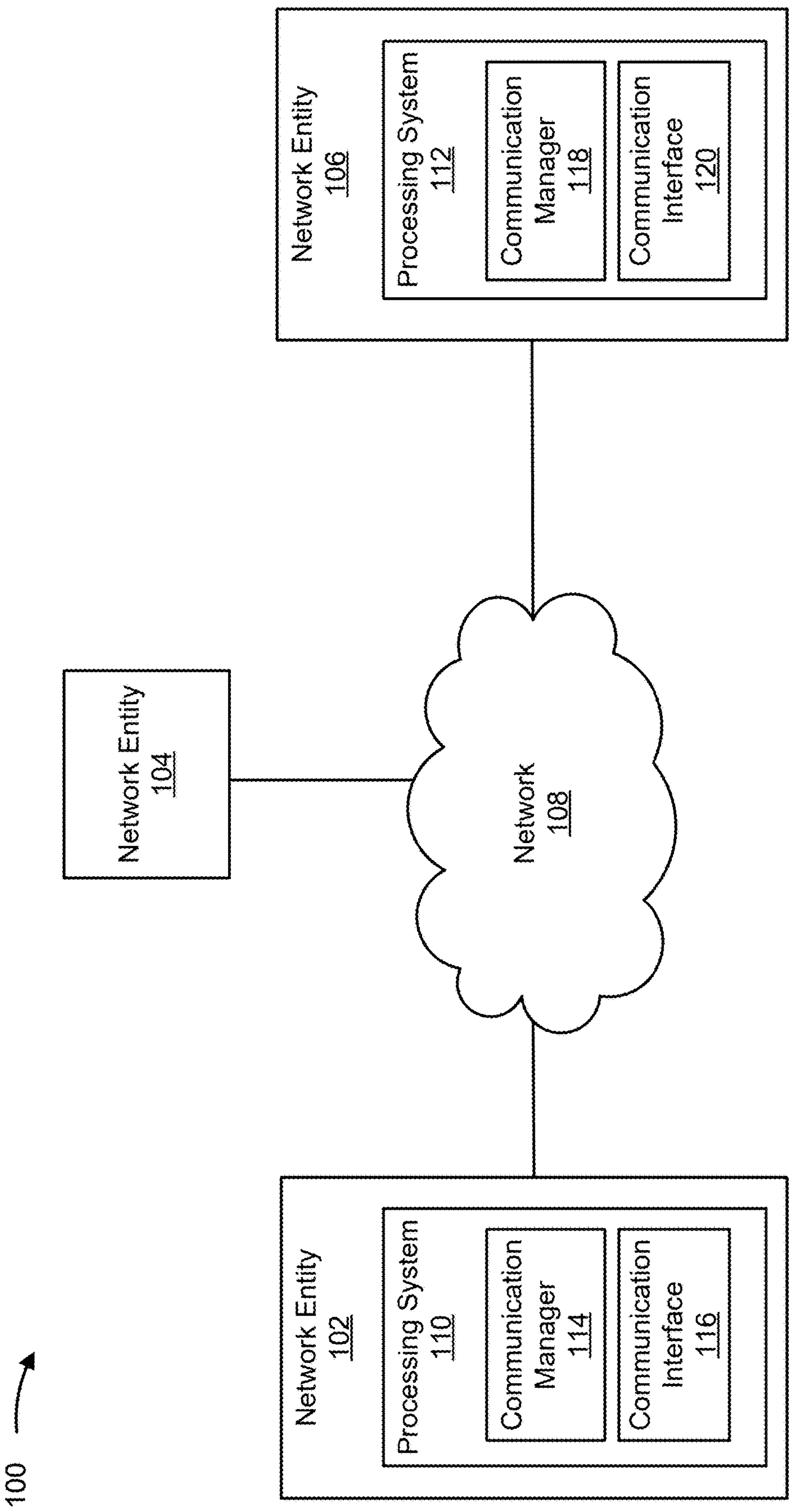
FIG. 1 is a diagram illustrating an example environment in which apparatuses and/or methods described herein may be implemented, in accordance with the present disclosure.

In some examples, a network entity may transmit a type of communication in which probabilities of certain types of information being included in a given communication are non-uniform. For example, the type of communication may include feedback information. The feedback information may include hybrid automatic repeat request (HARQ) feedback and/or a feedback codebook. In the context of feedback information (e.g., HARQ feedback), "codebook" refers to a set of one or more (e.g., a matrix of one or more) feedback indications (e.g., acknowledgement (ACK) or negative ACK (NACK) indications) that can be transmitted via a single transmission (e.g., a single uplink transmission). In some cases, the network entity (e.g., a UE) may support HARQ feedback codebook transmissions. A HARQ feedback codebook transmission may include a feedback message that the network entity is to transmit to another network entity to provide feedback regarding, for example, downlink data transmission (for example, transmissions associated with a downlink channel). As used herein, a codebook may be a sequence of bits, which may be constructed using ACK/NACK feedback associated with multiple communications (e.g., multiple downlink communications) that are received by a network entity during a feedback window. A codebook may include one or more codewords. A codeword may include a message or communication. For example, a codeword may include one or more ACK/NACK feedback indications (e.g., a sequence of one or more HARQ ACK bit values and/or HARQ NACK bit values).

As described elsewhere herein, the network entity may communicate using one or more communication parameters that are configured to achieve a target error rate for a given channel, such as a downlink channel. The network entity may transmit a codebook indicating feedback (e.g., HARQ ACK/NACK feedback) for the given channel. Because the communication parameter(s) are configured to achieve the target error rate (e.g., target block error rate (BLER)) for the given channel, the feedback information for the given channel will be biased and/or non-uniform. For example, if the target BLER for the given channel is 10%, then the probability that feedback is ACK feedback is 90% for a given communication (e.g., a given transport block) transmitted via the given channel. In some examples, codebooks may be designed for uniform probability of messages with equal likelihood of the bit 0 and bit 1. In such examples, power is applied uniformly to all codewords in the codebook. For example, each codeword may be transmitted using the same transmit power. This results in inefficient power usage by the network entity transmitting the codebook.

In some examples, the network entity may utilize techniques for power control for non-uniform message transmissions to improve power savings. For example, more power may be proportionately assigned to less likely symbols (e.g., less likely codewords) and less power to more likely symbols (e.g., more likely codewords) to reduce the average transmit power and improve error performance (e.g., to reduce the average transmit power associated with meeting a given target error rate). For example, the network entity may scale a power of a codeword based on, or otherwise associated with, a probability associated with the codeword. As an example, the network entity may perform a power scaling procedure for the codeword $c(x^k)$ based on a power scaling parameter. In some examples, the second network entity may receive the power scaling parameter from the first network entity. In some examples, the power scaling parameter may be associated with a non-uniform probability of respective portions of the message $x^k$. For example, the power scaling procedure may use a scaling parameter of $$\log\left(\frac{1}{p(x^k)}\right),$$

where $p(x^k)$ is the non-uniform probability of the message $x^k$. The message $x^k$ may include one or more feedback indications, such as HARQ ACK indications or HARQ NACK indications, among other examples. In other words, if a codeword c has probability $\pi_c$, then the transmit power allocated to that codeword may be proportional to the probability associated with the codeword (e.g., $P_c \propto -\log \pi_c$, where $P_c$ is a power control parameter.

In some examples, the network entity may estimate channel information using a pilot. "Pilot" may refer to a known signal, such as a reference signal. To ensure reliable channel estimation, one or more network entities may use a traffic-to-pilot power ratio (TPR). The TPR indicates a ratio between a first transmit power of pilot signals transmitted via a channel and a second transmit power of data (or payload) signals transmitted via the channel (e.g., a ratio between the power allocated to data traffic and the power allocated to the pilot signals for a given channel). The TPR may impact channel estimation accuracy, beamforming performance, spectral efficiency, interference mitigation, and/or dynamic resource allocation, among other examples. In examples where a codebook uses uniform power for all codewords, the TPR may be a static value. For example, the TPR may be based on a quantity of code division multiplex (CDM) groups per resource element in a pilot signal (e.g., a demodulation reference signal (DMRS)) as compared to a quantity of CDM groups per resource element in data traffic. As an example, for a physical uplink control channel (PUCCH), where the pilot signal (e.g., the DMRS) and data traffic both have the rank 1, the TPR may be 0 decibels (dB). However, where power scaling or power shaping is applied to vary the transmit power for codewords in a codebook (e.g., based on the nonuniform probabilities of respective codewords), the TPR may vary over time based on the power scaling or power shaping being applied. As a result, network entities that are communicating may be unaware of a TPR for a given channel at a given time. The varying TPR (e.g., that may have a value different than 0 dB) may negatively impact the performance of channel estimation accuracy, beamforming performance, spectral efficiency, interference mitigation, and/or dynamic resource allocation, among other examples.

Various aspects relate generally to TPR (e.g., average TPR) signaling for control channels (e.g., uplink control channels, downlink control channels, sidelink control channels, or other control channels). Some aspects more specifically relate to a first network entity (e.g., a user equipment (UE) or a network node) transmitting, and a second network entity receiving, information indicative of a TPR (e.g., an average TPR) for one or more control channel communications (e.g., one or more uplink control channel communications). The TPR may be, or include, information indicative of a difference (or overage) in power of data transmissions included in the one or more control channel communications, compared to reference signal (e.g., pilot signal) transmissions included in the one or more control channel communications. The first network entity and the second network entity may use the average TPR to scale a codebook, to generate a scaled codebook. "Scaling" the codebook refers to scaling one or more codeword powers (e.g., one or more power shaping (or power control) parameters for respective codewords in the codebook) associated with the codebook using a scaling factor (where the scaling factor is based on, or otherwise associated with, the signaled TPR). In other words, the scaled codebook may include the same codewords as the codebook, but with scaled power shaping parameter(s) for respective codewords.

For example, the codebook may be associated with power shaping parameters for respective codewords included in the scaled codebook (e.g., the codebook may be associated with per-codeword power shaping to enable a digital and/or fine-grained control of the power applied to respective codewords), which is referred to herein as "per-codeword power shaping." In some aspects, the first network entity and the second network entity may communicate (e.g., transmit or receive) a second one or more control channel communications using the scaled codebook. Although some examples are described herein in connection with uplink control channel communications, the techniques described herein may be similarly applied to other types of communications that use codebooks associated with per-codeword power shaping (e.g., sidelink communications, downlink communications, peer-to-peer communications, or other types of communications).

Particular aspects of the subject matter described in this disclosure can be implemented to realize one or more of the following potential advantages. In some examples, by communicating the average TPR for one or more control channel communications, the described techniques can be used to enable the codebook to be scaled such that the average TPR for the second one or more control channel communications (e.g., communicated using the scaled codebook) is a target TPR. This enables the first network entity and the second network entity to dynamically update (e.g., scale) the codebook to improve the likelihood that control channel communications have the target TPR. For example, the target TPR may be 0 dB or another value that improves channel estimation accuracy and/or reliability, beamforming performance, spectral efficiency, interference mitigation, and/or dynamic resource allocation, among other examples. For example, by communicating the second one or more control channel communications using the scaled codebook, the first network entity and the second network entity may improve channel estimation accuracy and/or reliability, beamforming performance, spectral efficiency, interference mitigation, and/or dynamic resource allocation, among other examples, because the second one or more control channel communications may have the target TPR (e.g., 0 dB or close to 0 dB).

Additionally, by the first network entity transmitting the information indicative of the average TPR, the described techniques can be used to ensure that the first network entity and the second network entity use the same codebook (e.g., the same power shaping parameter(s)) for the control channel communications when the TPR for control channel communications can vary over time. This enables the first network entity and the second network entity to dynamically update the codebook used for the control channel communications (e.g., to achieve the target TPR for the uplink control channel communications) in a synchronized manner. This reduces the likelihood of decoding errors or reduced performance for the control channel communications that would otherwise be caused by the first network entity and the second network entity using different codebooks for communicating (e.g., transmitting, receiving, modulating, encoding, demodulating, and/or decoding) the control channel communications.

Various aspects of the disclosure are described more fully hereinafter with reference to the accompanying drawings. This disclosure may, however, be embodied in many different forms and is not limited to any specific structure, function, example, aspect, or the like presented throughout this disclosure. This disclosure includes, for example, any aspect disclosed herein, whether implemented independently of or combined with any other aspect of the disclosure. For example, an apparatus may be implemented or a method may be practiced using any number of the aspects set forth herein. In addition, the scope of the disclosure includes such an apparatus or method which is practiced using other structure, functionality, or structure and functionality in addition to or other than the various aspects of the disclosure set forth herein. Any aspect of the disclosure disclosed herein may be embodied by one or more elements of a claim.

Aspects and examples generally include a method, apparatus, network node, network entity, system, computer program product, non-transitory computer-readable medium, user equipment, base station, wireless communication device, and/or processing system as described or substantially described herein with reference to and as illustrated by the drawings and specification.

This disclosure may be readily utilized as a basis for modifying or designing other structures for carrying out the same purposes of the present disclosure. Such equivalent constructions do not depart from the scope of the appended claims. Characteristics of the example concepts disclosed herein, both their organization and method of operation, together with associated example advantages, are described in the following description and in connection with the accompanying figures. Each of the figures is provided for the purposes of illustration and description, and not as a definition of the limits of the claims. Each of the figures is provided for the purposes of illustration and description, and not as a definition of the limits of the claims.

While aspects are described in the present disclosure by illustration to some examples, those skilled in the art understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described example aspects and example features may include additional example components and example features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). Aspects described herein may be practiced in a wide variety of devices, components, systems, distributed arrangements, and/or end-user devices of varying size, shape, and constitution.

Several aspects of telecommunication systems are presented with reference to various apparatuses and techniques. These apparatuses and techniques are described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Multiple-access RATs have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, Internet of Things (IoT) connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example environment 100 in which apparatuses and/or methods described herein may be implemented, in accordance with the present disclosure. As shown in FIG. 1, the environment 100 may include a network entity 102, a network entity 104, and a network entity 106, that may communicate with one another via a network 108. The network entities 102, 104, and 106, may be dispersed throughout the network 108, and each network entity 102, 104, and 106 may be stationary and/or mobile. The network 108 may include wired communication connections, wireless communication connections, or a combination of wired and wireless communication connections.

The network 108 may include, for example, a cellular network (e.g., a Long-Term Evolution (LTE) network, a code division multiple access (CDMA) network, a 4G network, a 5G network, a 6G network, or another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. The network 108 may include a wireless communication network 200, described in connection with FIG. 2.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IoT) device, an energy harvesting (EH)-capable device, a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as the network 108. For example, a "network entity" is not limited to an entity that is currently located in and/or currently operating in the network. Rather, a network entity may be any entity that is capable of communicating and/or operating in the network. A network entity may include a network node 210 or a UE 220, described in more detail in connection with FIG. 2.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity" in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, "first network entity" may refer to a first UE, a first base station, a first apparatus, a first device, a first computing system, a first set of one or more one or more components, a first processing entity, or the like configured to receive the information; and "second network entity" may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network entity may be described as being configured to transmit information to a second network entity. In this example and consistent with this disclosure, disclosure that the first network entity is configured to transmit information to the second network entity includes disclosure that the first network entity is configured to provide, send, output, communicate, or transmit information to the second network entity. Similarly, in this example and consistent with this disclosure, disclosure that the first network entity is configured to transmit information to the second network entity includes disclosure that the second network entity is configured to receive, obtain, or decode the information that is provided, sent, output, communicated, or transmitted by the first network entity.

As shown, the network entity 102 may include a processing system 110. Similarly, the network entity 106 may include a processing system 112. A processing system may include one or more components (or subcomponents), such as one or more components described herein. For example, a respective component of the one or more components may be, be similar to, include, or be included in at least one memory, at least one communication interface, or at least one processor. For example, a processing system may include one or more components. In such an example, the one or more components may include a first component, a second component, and a third component. In this example, the first component may be coupled to a second component and a third component. In this example, the first component may be at least one processor, the second component may be a communication interface, and the third component may be at least one memory. A processing system may generally be a system one or more components that may perform one or more functions, such as any function or combination of functions described herein. For example, one or more components may receive input information (e.g., any information that is an input, such as a signal, any digital information, or any other information), one or more components may process the input information to generate output information (e.g., any information that is an output, such as a signal or any other information), one or more components may perform any function as described herein, or any combination thereof.

As described herein, an "input" and "input information" may be used interchangeably. Similarly, as described herein, an "output" and "output information" may be used interchangeably. Any information generated by any component may be provided to one or more other systems or components of, for example, a network entity described herein. For example, a processing system may include a first component configured to receive or obtain information, a second component configured to process the information to generate output information, and/or a third component configured to provide the output information to other systems or components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a processing system may include at least one memory, at least one communication interface, and/or at least one processor, where the at least one processor may, for example, be coupled to the at least one memory and the at least one communication interface.

A processing system of a network entity described herein may interface with one or more other components of the network entity, may process information received from one or more other components (such as input information), or may output information to one or more other components. For example, a processing system may include a first component configured to interface with one or more other components of the network entity to receive or obtain information, a second component configured to process the information to generate one or more outputs, and/or a third component configured to output the one or more outputs to one or more other components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a chip or modem of the network entity may include a processing system. The processing system may include a first communication interface to receive or obtain information, and a second communication interface to output, transmit, or provide information. In some examples, the first communication interface may be an interface configured to receive input information, and the information may be provided to the processing system. In some examples, the second system interface may be configured to transmit information output from the chip or modem. The second communication interface may also obtain or receive input information, and the first communication interface may also output, transmit, or provide information.

For example, as shown in FIG. 1, the processing system 110 may include a (e.g., one or more) communication manager 114 and one or more communication interfaces 116. The communication manager 114 may be configured to perform one or more communication tasks as described herein. In some aspects, the communication manager 114 may direct the communication interface 120 and/or the processing system 110 to perform one or more communication tasks as described herein. Similarly, the processing system 112 may include a (e.g., one or more) communication manager 118 and one or more communication interfaces 120. The communication manager 118 may be configured to perform one or more communication tasks as described herein. In some aspects, the processing system 112 and/or the communication manager 118 may direct the communication interface 120 to perform one or more communication tasks as described herein. Although depicted, for clarity of description, with reference only to the network entities 102 and 104, any one or more of the network entities 102, 104, and 106 also may include a communication manager and a communication interface.

As used herein, "communication interface" refers to an interface that enables communication (e.g., wireless communication, wired communication, or a combination thereof) between a first network entity and a second network entity. A communication interface may include electronic circuitry that enables a network entity to transmit, receive, or otherwise perform the communication. A communication interface may be, be similar to, include, or be included in one or more components that are configured to enable communication between the first network entity and the second network entity. For example, a communication interface may include a transmission component, a reception component, and/or a transceiver, among other examples. For example, a communication interface may include one or more transceivers, one or more receivers, and/or one or more transmitters configured to communicate with other devices, such as via a wired connection, a wireless connection, or a combination of wired and wireless connections. In some examples, a communication interface may include one or more RF components, an RF front end, one or more antennas, one or more transmit or receive processors, a demodulation component, and/or a modulation component, among other examples.

A communication interface may include a transmission component and/or a reception component. For example, a communication interface may include a transceiver and/or one or more separate receivers and/or transmitters that enable a network entity to communicate with other devices, such as via a wired connection, a wireless connection, or a combination of wired and wireless connections. In some examples, a communication interface may include one or more radio frequency reflective elements and/or one or more radio frequency refractive elements. The communication interface may enable the network entity to receive information from another apparatus and/or provide information to another apparatus. In some examples, the communication interface may include an Ethernet interface, an optical interface, a coaxial interface, an infrared interface, an RF interface, a universal serial bus (USB) interface, a Wi-Fi interface, a cellular network interface, a wireless modem, an inter-integrated circuit ($I^2C$), and/or a serial peripheral interface (SPI), among other examples.

As described herein, a network entity (e.g., the network entity 102 and/or the network entity 106) may be configured to perform one or more operations. Reference to a network entity being configured to perform one or more operations may refer to a processing system of the network entity being configured to perform the one or more operations and/or the processing system being configured to cause one or more components of the network entity to perform the one or more operations. For example, reference to the processing system being configured to perform one or more operations may refer to one or more components (or subcomponents) of the processing system performing the one or more operations. For example, the one or more components of the processing system may include at least one memory, at least one processor, and/or at least one communication interface, among other examples, that are configured to perform one or more (or all) of the one or more operations, and/or any combination thereof. Where reference is made to the network entity and/or the processing system being configured to perform operations, the network entity and/or the processing system may be configured to cause one component to perform all operations, or to cause more than one component to collectively perform the operations. When the network entity and/or the processing system is configured to cause more than one component to collectively perform the operations, each operation need not be performed by each of those components (e.g., different operations may be performed by different components) and/or each operation need not be performed in whole by only one component (e.g., different components may perform different sub-functions of an operation).

As described in more detail elsewhere herein, the network entity 102 may (e.g., the processing system 110 may, or the processing system 110 may cause the communication manager 114 and/or the communication interface 116 to) transmit first information indicative of an average TPR for a first set of one or more control channel communications; scale, based on the first information, one or more codeword powers associated with a codebook to generate one or more scaled codeword powers; and/or communicate, using the one or more scaled codeword powers, a second set of one or more control channel communications. Additionally, or alternatively, the network entity 102 and/or the communication manager 114 may perform one or more other operations described herein.

As described in more detail elsewhere herein, the network entity 106 may (e.g., the processing system 112 may, or the processing system 112 may cause the communication manager 114 and/or the communication interface 116 to) receive first information indicative of an average TPR for a first set of one or more control channel communications; scale, based on the first information, one or more codeword powers associated with a codebook to generate one or more scaled codeword powers; and/or communicate, using the one or more scaled codeword powers, a second set of one or more control channel communications. Additionally, or alternatively, the network entity 106 and/or the communication manager 118 may perform one or more other operations described herein.

The number and arrangement of entities shown in FIG. 1 are provided as one or more examples. In practice, there may be additional network entities and/or networks, fewer network entities and/or networks, different network entities and/or networks, or differently arranged network entities and/or networks than those shown in FIG. 1. Furthermore, the network entity 102, 104, and 106 may be implemented using a single apparatus or multiple apparatuses.

Figure 2:
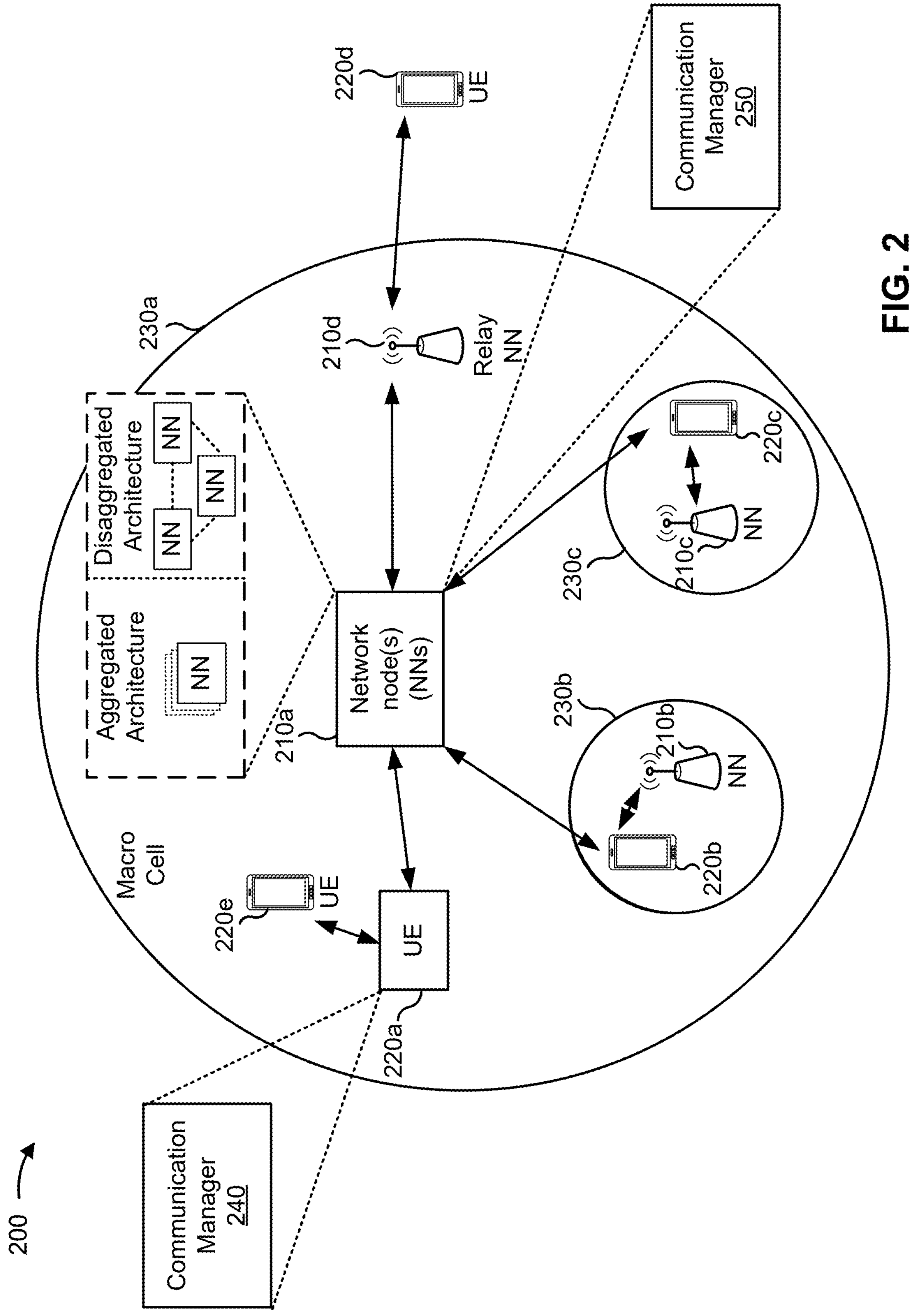
FIG. 2 is a diagram illustrating an example of a wireless communication network, in accordance with the present disclosure.

FIG. 2 is a diagram illustrating an example of a wireless communication network 200, in accordance with the present disclosure. The wireless communication network 200 may be or may include elements of a 5G (or NR) network or a 6G network, among other examples. The wireless communication network 200 may include multiple network nodes 210, shown as a network node (NN) 210*a*, a network node 210*b*, a network node 210*c*, and a network node 210*d*. The network nodes 210 may support communications with multiple UEs 220, shown as a UE 220*a*, a UE 220*b*, a UE 220*c*, a UE 220*d*, and a UE 220*e*.

The network nodes 210 and the UEs 220 of the wireless communication network 200 may communicate using the electromagnetic spectrum, which may be subdivided by frequency or wavelength into various classes, bands, carriers, and/or channels. For example, devices of the wireless communication network 200 may communicate using one or more operating bands. In some aspects, multiple wireless communication networks 200 may be deployed in a given geographic area. Each wireless communication network 200 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHz), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHz," if used herein, may broadly refer to frequencies that are less than 6 GHz, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 200 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 210 may include one or more devices, components, or systems that enable communication between a UE 220 and one or more devices, components, or systems of the wireless communication network 200. A network node 210 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 210 may be implemented as a single physical node (for example, a single physical structure) or may be implemented as two or more physical nodes (for example, two or more distinct physical structures). For example, a network node 210 may be a device or system that implements part of a radio protocol stack, a device or system that implements a full radio protocol stack (such as a full gNB protocol stack), or a collection of devices or systems that collectively implement the full radio protocol stack. For example, and as shown, a network node 210 may be an aggregated network node (having an aggregated architecture), meaning that the network node 210 may implement a full radio protocol stack that is physically and logically integrated within a single node (for example, a single physical structure) in the wireless communication network 200. For example, an aggregated network node 210 may consist of a single standalone base station or a single TRP that uses a full radio protocol stack to enable or facilitate communication between a UE 220 and a core network of the wireless communication network 200.

Alternatively, and as also shown, a network node 210 may be a disaggregated network node (sometimes referred to as a disaggregated base station), meaning that the network node 210 may implement a radio protocol stack that is physically distributed and/or logically distributed among two or more nodes in the same geographic location or in different geographic locations. For example, a disaggregated network node may have a disaggregated architecture. In some deployments, disaggregated network nodes 210 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 210 of the wireless communication network 200 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 220, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 220.

In some aspects, a single network node 210 may include a combination of one or more CUs, one or more DUs, and/or one or more RUs. Additionally or alternatively, a network node 210 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 210 (for example, a base station, an RU, or a TRP) may provide communication coverage for a particular geographic area. In the 3GPP, the term "cell" can refer to a coverage area of a network node 210 or to a network node 210 itself, depending on the context in which the term is used. A network node 210 may support one or multiple (for example, three) cells. In some examples, a network node 210 may provide communication coverage for a macro cell, a pico cell, a femto cell, or another type of cell. A macro cell may cover a relatively large geographic area (for example, several kilometers in radius) and may allow unrestricted access by UEs 220 with service subscriptions. A pico cell may cover a relatively small geographic area and may allow unrestricted access by UEs 220 with service subscriptions. A femto cell may cover a relatively small geographic area (for example, a home) and may allow restricted access by UEs 220 having association with the femto cell (for example, UEs 220 in a closed subscriber group (CSG)). A network node 210 for a macro cell may be referred to as a macro network node. A network node 210 for a pico cell may be referred to as a pico network node. A network node 210 for a femto cell may be referred to as a femto network node or an in-home network node. In some examples, a cell may not necessarily be stationary. For example, the geographic area of the cell may move according to the location of an associated mobile network node 210 (for example, a train, a satellite base station, an unmanned aerial vehicle, or a non-terrestrial network (NTN) network node).

The wireless communication network 200 may be a heterogeneous network that includes network nodes 210 of different types, such as macro network nodes, pico network nodes, femto network nodes, relay network nodes, aggregated network nodes, and/or disaggregated network nodes, among other examples. In the example shown in FIG. 1, the network node 210*a* may be a macro network node for a macro cell 230*a*, the network node 210*b* may be a pico network node for a pico cell 230*b*, and the network node 210*c* may be a femto network node for a femto cell 230*c*. Various different types of network nodes 210 may generally transmit at different power levels, serve different coverage areas, and/or have different impacts on interference in the wireless communication network 200 than other types of network nodes 210. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 210 may be, may include, or may operate as an RU, a TRP, or a base station that communicates with one or more UEs 220 via a radio access link (which may be referred to as a "Uu" link). The radio access link may include a downlink and an uplink. "Downlink" (or "DL") refers to a communication direction from a network node 210 to a UE 220, and "uplink" (or "UL") refers to a communication direction from a UE 220 to a network node 210. Downlink channels may include one or more control channels and one or more data channels. A downlink control channel may be used to transmit downlink control information (DCI) (for example, scheduling information, reference signals, and/or configuration information) from a network node 210 to a UE 220. A downlink data channel may be used to transmit downlink data (for example, user data associated with a UE 220) from a network node 210 to a UE 220. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 220 to a network node 210. An uplink data channel may be used to transmit uplink data (for example, user data associated with a UE 220) from a UE 220 to a network node 210. Uplink control channels may include one or more physical uplink control channels (PUCCHs), and uplink data channels may include one or more physical uplink shared channels (PUSCHs). The downlink and the uplink may each include a set of resources on which the network node 210 and the UE 220 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into BWPs. A BWP may be a block of frequency domain resources (for example, a block of resource blocks) that are allocated for one or more UEs 220. A UE 220 may be configured with both an uplink BWP and a downlink BWP (where the uplink BWP and the downlink BWP may be the same BWP or different BWPs). A BWP may be dynamically configured (for example, by a network node 210 transmitting a DCI configuration to the one or more UEs 220) and/or reconfigured, which means that a BWP can be adjusted in real-time (or near-real-time) based on changing network conditions in the wireless communication network 200 and/or based on the specific requirements of the one or more UEs 220. This enables more efficient use of the available frequency domain resources in the wireless communication network 200 because fewer frequency domain resources may be allocated to a BWP for a UE 220 (which may reduce the quantity of frequency domain resources that a UE 220 is required to monitor), leaving more frequency domain resources to be spread across multiple UEs 220. Thus, BWPs may also assist in the implementation of lower-capability UEs 220 by facilitating the configuration of smaller bandwidths for communication by such UEs 220.

As indicated above, a BWP may be configured as a subset or a part of a total or full component carrier bandwidth and generally forms or encompasses a set of common resource blocks (CRBs) within the full component carrier bandwidth. In other words, within the carrier bandwidth, a BWP starts at a CRB and may span a set of CRBs. Each BWP may be associated with its own numerology (indicating a sub-carrier spacing (SCS) and cyclic prefix (CP)). A UE 220 may be configured with up to four downlink BWPs and up to four uplink BWPs for each serving cell. To enable reasonable UE battery consumption, only one BWP in the downlink and one BWP in the uplink are generally active at a given time on an active serving cell under typical operation. The active BWP defines the operating bandwidth of the UE 220 within the operating bandwidth of the serving cell while all other BWPs with which the UE 220 is configured are deactivated. On deactivated BWPs, the UE 220 does not transmit or receive any communications.

As described above, in some aspects, the wireless communication network 200 may be, may include, or may be included in, an IAB network. In an IAB network, at least one network node 210 is an anchor network node that communicates with a core network. An anchor network node 210 may also be referred to as an IAB donor (or "IAB-donor"). The anchor network node 210 may connect to the core network via a wired backhaul link. For example, an Ng interface of the anchor network node 210 may terminate at the core network. Additionally or alternatively, an anchor network node 210 may connect to one or more devices of the core network that provide a core access and mobility management function (AMF). An IAB network also generally includes multiple non-anchor network nodes 210, which may also be referred to as relay network nodes or simply as IAB nodes (or "IAB-nodes"). Each non-anchor network node 210 may communicate directly with the anchor network node 210 via a wireless backhaul link to access the core network, or may communicate indirectly with the anchor network node 210 via one or more other non-anchor network nodes 210 and associated wireless backhaul links that form a backhaul path to the core network. Some anchor network node 210 or other non-anchor network node 210 may also communicate directly with one or more UEs 220 via wireless access links that carry access traffic. In some examples, network resources for wireless communication (such as time resources, frequency resources, and/or spatial resources) may be shared between access links and backhaul links.

In some examples, any network node 210 that relays communications may be referred to as a relay network node, a relay station, or simply as a relay. A relay may receive a transmission of a communication from an upstream station (for example, another network node 210 or a UE 220) and transmit the communication to a downstream station (for example, a UE 220 or another network node 210). In this case, the wireless communication network 200 may include or be referred to as a "multi-hop network." In the example shown in FIG. 1, the network node 210*d* (for example, a relay network node) may communicate with the network node 210*a* (for example, a macro network node) and the UE 220*d* in order to facilitate communication between the network node 210*a* and the UE 220*d*. Additionally or alternatively, a UE 220 may be or may operate as a relay station that can relay transmissions to or from other UEs 220. A UE 220 that relays communications may be referred to as a UE relay or a relay UE, among other examples.

The UEs 220 may be physically dispersed throughout the wireless communication network 200, and each UE 220 may be stationary or mobile. A UE 220 may be, may include, or may be included in an access terminal, another terminal, a mobile station, or a subscriber unit. A UE 220 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an extended reality (XR) device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 220 and/or a network node 210 may include one or more chips, system-on-chips (SoCs), chipsets, packages, or devices that individually or collectively constitute or comprise a processing system (such as the processing system 110 and/or the processing system 112). The processing system includes processor (or "processing") circuitry in the form of one or multiple processors, microprocessors, processing units (such as central processing units (CPUs), graphics processing units (GPUs), neural processing units (NPUs)

and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 220 may include or may be included in a housing that houses components associated with the UE 220 including the processing system.

Some UEs 220 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs". An MTC UE may be, may include, or may be included in or coupled with a robot, an unmanned aerial vehicle or drone, a remote device, a sensor, a meter, a monitor, and/or a location tag. Some UEs 220 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 220 may be considered Customer Premises Equipment, which may include telecommunications devices that are installed at a customer location (such as a home or office) to enable access to a service provider's network (such as included in or in communication with the wireless communication network 200).

Some UEs 220 may be classified according to different categories in association with different complexities and/or different capabilities. UEs 220 in a first category may facilitate massive IoT in the wireless communication network 200, and may offer low complexity and/or cost relative to UEs 220 in a second category. UEs 220 in a second category may include mission-critical IoT devices, legacy UEs, baseline UEs, high-tier UEs, advanced UEs, full-capability UEs, and/or premium UEs that are capable of ultra-reliable low-latency communication (URLLC), enhanced mobile broadband (eMBB), and/or precise positioning in the wireless communication network 200, among other examples. A third category of UEs 220 may have mid-tier complexity and/or capability (for example, a capability between UEs 220 of the first category and UEs 220 of the second capability). A UE 220 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 220 (for example, shown as UE 220*a* and UE 220*e*) may communicate directly with one another using sidelink communications (for example, without communicating by way of a network node 210 as an intermediary). As an example, the UE 220*a* may directly transmit data, control information, or other signaling as a sidelink communication to the UE 220*e*. This is in contrast to, for example, the UE 220*a* first transmitting data in an uplink (UL) communication to a network node 210, which then transmits the data to the UE 220*e* in a downlink (DL) communication. In various examples, the UEs 220 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 210 may schedule and/or allocate resources for sidelink communications between UEs 220 in the wireless communication network 200. In some other deployments and configurations, a UE 220 (instead of a network node 210) may perform, or collaborate or negotiate with one or more other UEs to perform, scheduling operations, resource selection operations, and/or other operations for sidelink communications.

In various examples, some of the network nodes 210 and the UEs 220 of the wireless communication network 200 may be configured for full-duplex operation in addition to half-duplex operation. A network node 210 or a UE 220 operating in a half-duplex mode may perform only one of transmission or reception during particular time resources, such as during particular slots, symbols, or other time periods. Half-duplex operation may involve time-division duplexing (TDD), in which DL transmissions of the network node 210 and UL transmissions of the UE 220 do not occur in the same time resources (that is, the transmissions do not overlap in time). In contrast, a network node 210 or a UE 220 operating in a full-duplex mode can transmit and receive communications concurrently (for example, in the same time resources). By operating in a full-duplex mode, network nodes 210 and/or UEs 220 may generally increase the capacity of the network and the radio access link. In some examples, full-duplex operation may involve frequency-division duplexing (FDD), in which DL transmissions of the network node 210 are performed in a first frequency band or on a first component carrier and transmissions of the UE 220 are performed in a second frequency band or on a second component carrier different than the first frequency band or the first component carrier, respectively. In some examples, full-duplex operation may be enabled for a UE 220 but not for a network node 210. For example, a UE 220 may simultaneously transmit an UL transmission to a first network node 210 and receive a DL transmission from a second network node 210 in the same time resources. In some other examples, full-duplex operation may be enabled for a network node 210 but not for a UE 220. For example, a network node 210 may simultaneously transmit a DL transmission to a first UE 220 and receive an UL transmission from a second UE 220 in the same time resources. In some other examples, full-duplex operation may be enabled for both a network node 210 and a UE 220.

In some examples, the UEs 220 and the network nodes 210 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

The network node 210 may provide the UE 220 with a configuration of transmission configuration indicator (TCI) states that indicate or correspond to beams that may be used by the UE 220, such as for receiving one or more communications via a physical channel. For example, the network node 210 may indicate (for example, using DCI) an activated TCI state to the UE 220, which the UE 220 may use to generate a beam for receiving one or more communications via the physical channel. A beam indication may be, or may include, a TCI state information element, a beam identifier (ID), spatial relation information, a TCI state ID, a closed loop index, a panel ID, a TRP ID, and/or a sounding reference signal (SRS) set ID, among other examples. A TCI state information element (sometimes referred to as a TCI state herein) may indicate particular information associated with a beam. Spatial relation information may similarly indicate information associated with an uplink beam. The beam indication may be a joint or separate DL/UL beam indication in a unified TCI framework. In a unified TCI framework, a network node 210 may support common TCI state ID update and activation, which may provide common quasi co-location (QCL) and/or common UL transmission spatial filters across a set of configured component carriers. This type of beam indication may apply to intra-band carrier aggregation, as well as to joint DL/UL and separate DL/UL beam indications. The common TCI state ID may imply that one reference signal determined according to the TCI state (s) indicated by a common TCI state ID is used to provide QCL Type-D indication and to determine UL transmission spatial filters across the set of configured CCs.

In some aspects, the UE 220 may include a communication manager 240. As described in more detail elsewhere herein, the communication manager 240 may transmit first information indicative of an average TPR for a first set of one or more control channel communications; scale, based on the first information, one or more codeword powers associated with a codebook to generate one or more scaled codeword powers; and/or communicate (e.g., transmit or receive), using the one or more scaled codeword powers, a second set of one or more control channel communications. In some other aspects, the communication manager 240 may receive first information indicative of an average TPR for a first set of one or more control channel communications; scale, based on the first information, one or more codeword powers associated with a codebook to generate one or more scaled codeword powers; and/or communicate (e.g., transmit or receive), using the one or more scaled codeword powers, a second set of one or more control channel communications. Additionally or alternatively, the communication manager 240 may perform one or more other operations described herein.

In some aspects, the network node 210 may include a communication manager 250. As described in more detail elsewhere herein, the communication manager 250 may transmit first information indicative of an average TPR for a first set of one or more control channel communications; scale, based on the first information, one or more codeword powers associated with a codebook to generate one or more scaled codeword powers; and/or communicate (e.g., transmit or receive), using the one or more scaled codeword powers, a second set of one or more control channel communications. In some other aspects, the communication manager 250 may receive first information indicative of an average TPR for a first set of one or more control channel communications; scale, based on the first information, one or more codeword powers associated with a codebook to generate one or more scaled codeword powers; and/or communicate (e.g., transmit or receive), using the one or more scaled codeword powers, a second set of one or more control channel communications. Additionally or alternatively, the communication manager 250 may perform one or more other operations described herein.

Figure 3:
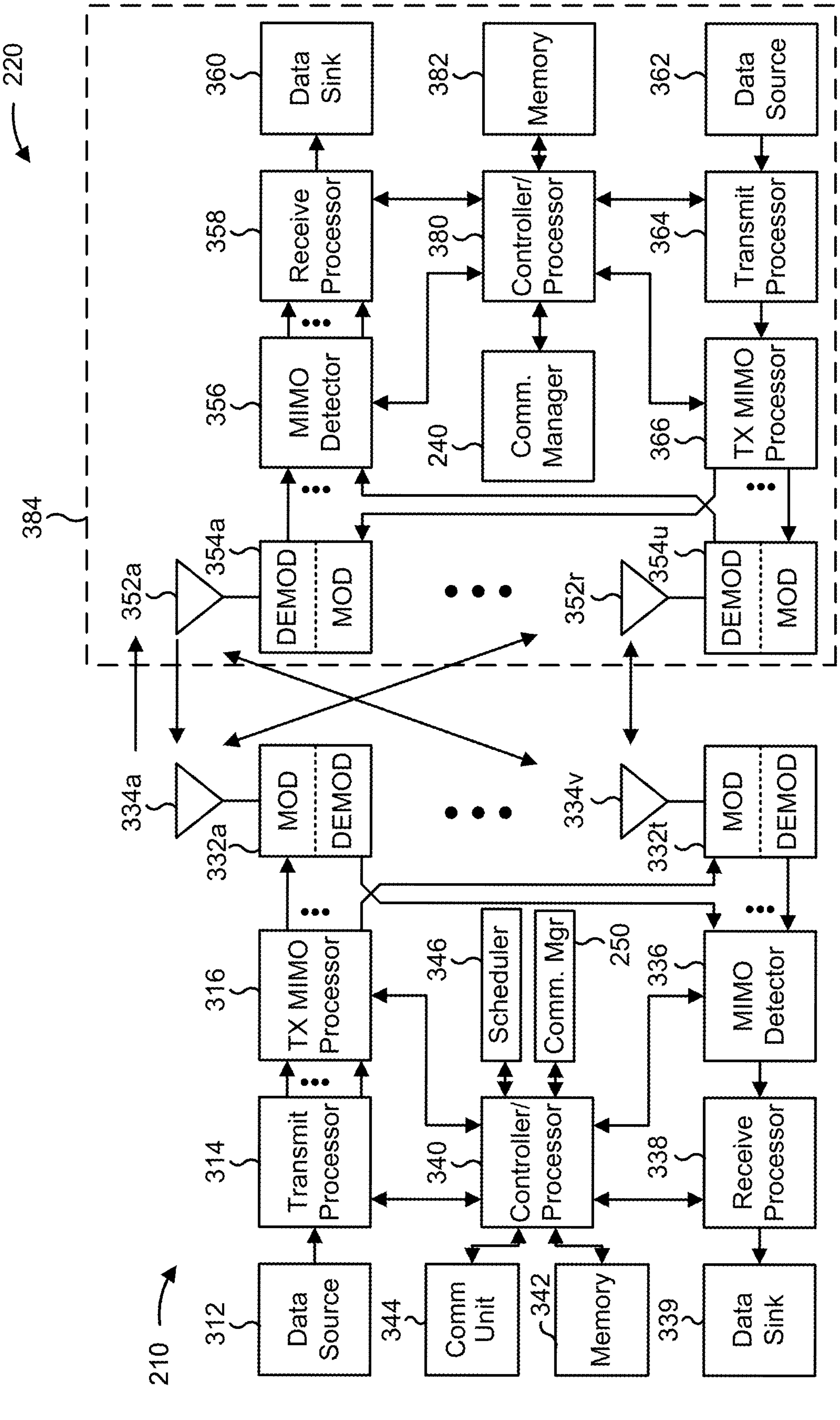
FIG. 3 is a diagram illustrating an example network node in communication with an example user equipment (UE) in a wireless network in accordance with the present disclosure.

FIG. 3 is a diagram illustrating an example network node 210 in communication with an example UE 220 in a wireless network in accordance with the present disclosure.

As shown in FIG. 3, the network node 210 may include a data source 312, a transmit processor 314, a transmit (TX) MIMO processor 316, a set of modems 332 (shown as 332*a* through 332*t*, where $t \geq 1$), a set of antennas 334 (shown as 334*a* through 334*v*, where $v \geq 1$), a MIMO detector 336, a receive processor 338, a data sink 339, a controller/processor 340, a memory 342, a communication unit 344, a scheduler 346, and/or a communication manager 250, among other examples. In some configurations, one or a combination of the antenna(s) 334, the modem(s) 332, the MIMO detector 336, the receive processor 338, the transmit processor 314, and/or the TX MIMO processor 316 may be included in a transceiver of the network node 210. The transceiver may be under control of and used by one or more processors, such as the controller/processor 340, and in some aspects in conjunction with processor-readable code stored in the memory 342, to perform aspects of the methods, processes, and/or operations described herein. In some aspects, the network node 210 may include one or more interfaces, communication components, and/or other components that facilitate communication with the UE 220 or another network node.

The terms "processor," "controller," or "controller/processor" may refer to one or more controllers and/or one or more processors. For example, reference to "a/the processor," "a/the controller/processor," or the like (in the singular) refers to any one or more of the processors described in connection with FIG. 3, such as a single processor or a combination of multiple different processors. Reference to "one or more processors" refers to any one or more of the processors described in connection with FIG. 3. For example, one or more processors of the network node 210 may include transmit processor 314, TX MIMO processor 316, MIMO detector 336, receive processor 338, and/or controller/processor 340. Similarly, one or more processors of the UE 220 may include MIMO detector 356, receive processor 358, transmit processor 364, TX MIMO processor 366, and/or controller/processor 380.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" refers to any one or more memories of a corresponding device, such as the memory described in connection with FIG. 3. For example, operation described as being performed by one or more memories can be performed by the same subset of the one or more memories or different subsets of the one or more memories.

For downlink communication from the network node 210 to the UE 220, the transmit processor 314 may receive data ("downlink data") intended for the UE 220 (or a set of UEs that includes the UE 220) from the data source 312 (such as a data pipeline or a data queue). In some examples, the transmit processor 314 may select one or more MCSs for the UE 220 in accordance with one or more channel quality indicators (CQIs) received from the UE 220. The network node 210 may process the data (for example, including encoding the data) for transmission to the UE 220 on a downlink in accordance with the MCS(s) selected for the UE 220 to generate data symbols. The transmit processor 314 may process system information (for example, semi-static resource partitioning information (SRPI)) and/or control information (for example, CQI requests, grants, and/or upper layer signaling) and provide overhead symbols and/or control symbols. The transmit processor 314 may generate reference symbols for reference signals (for example, a cell-specific reference signal (CRS), a DMRS, or a channel state information (CSI) reference signal (CSI-RS)) and/or synchronization signals (for example, a primary synchronization signal (PSS) or a secondary synchronization signals (SSS)).

The TX MIMO processor 316 may perform spatial processing (for example, precoding) on the data symbols, the control symbols, the overhead symbols, and/or the reference symbols, if applicable, and may provide a set of output symbol streams (for example, T output symbol streams) to the set of modems 332. For example, each output symbol stream may be provided to a respective modulator component (shown as MOD) of a modem 332. Each modem 332 may use the respective modulator component to process (for example, to modulate) a respective output symbol stream (for example, for orthogonal frequency division multiplexing (OFDM)) to obtain an output sample stream. Each modem 332 may further use the respective modulator component to process (for example, convert to analog, amplify, filter, and/or upconvert) the output sample stream to obtain a time domain downlink signal. The modems 332*a* through 332*t* may together transmit a set of downlink signals (for example, T downlink signals) via the corresponding set of antennas 334.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 200. A data stream (for example, from the data source 312) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 220 to the network node 210, uplink signals from the UE 220 may be received by an antenna 334, may be processed by a modem 332 (for example, a demodulator component, shown as DEMOD, of a modem 332), may be detected by the MIMO detector 336 (for example, a receive (Rx) MIMO processor) if applicable, and/or may be further processed by the receive processor 338 to obtain decoded data and/or control information. The receive processor 338 may provide the decoded data to a data sink 339 (which may be a data pipeline, a data queue, and/or another type of data sink) and provide the decoded control information to a processor, such as the controller/processor 340.

The network node 210 may use the scheduler 346 to schedule one or more UEs 220 for downlink or uplink communications. In some aspects, the scheduler 346 may use DCI to dynamically schedule DL transmissions to the UE 220 and/or UL transmissions from the UE 220. In some examples, the scheduler 346 may allocate recurring time domain resources and/or frequency domain resources that the UE 220 may use to transmit and/or receive communications using an RRC configuration (for example, a semi-static configuration), for example, to perform semi-persistent scheduling (SPS) or to configure a configured grant (CG) for the UE 220.

One or more of the transmit processor 314, the TX MIMO processor 316, the modem 332, the antenna 334, the MIMO detector 336, the receive processor 338, and/or the controller/processor 340 may be included in an RF chain of the network node 210. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 210). In some aspects, the RF chain may be or may be included in a transceiver of the network node 210.

In some examples, the network node 210 may use the communication unit 344 to communicate with a core network and/or with other network nodes. The communication unit 344 may support wired and/or wireless communication protocols and/or connections, such as Ethernet, optical fiber, common public radio interface (CPRI), and/or a wired or wireless backhaul, among other examples. The network node 210 may use the communication unit 344 to transmit and/or receive data associated with the UE 220 or to perform network control signaling, among other examples. The communication unit 344 may include a transceiver and/or an interface, such as a network interface.

The UE 220 may include a set of antennas 352 (shown as antennas 352*a* through 352*r*, where r≥1), a set of modems 354 (shown as modems 354*a* through 354*u*, where u≥1), a MIMO detector 356, a receive processor 358, a data sink 360, a data source 362, a transmit processor 364, a TX MIMO processor 366, a controller/processor 380, a memory 382, and/or a communication manager 240, among other examples. One or more of the components of the UE 220 may be included in a housing 384. In some aspects, one or a combination of the antenna(s) 352, the modem(s) 354, the MIMO detector 356, the receive processor 358, the transmit processor 364, or the TX MIMO processor 366 may be included in a transceiver that is included in the UE 220. The transceiver may be under control of and used by one or more processors, such as the controller/processor 380, and in some aspects in conjunction with processor-readable code stored in the memory 382, to perform aspects of the methods, processes, or operations described herein. In some aspects, the UE 220 may include another interface, another communication component, and/or another component that facilitates communication with the network node 210 and/or another UE 220.

For downlink communication from the network node 210 to the UE 220, the set of antennas 352 may receive the downlink communications or signals from the network node 210 and may provide a set of received downlink signals (for example, R received signals) to the set of modems 354. For example, each received signal may be provided to a respective demodulator component (shown as DEMOD) of a modem 354. Each modem 354 may use the respective demodulator component to condition (for example, filter, amplify, downconvert, and/or digitize) a received signal to obtain input samples. Each modem 354 may use the respective demodulator component to further demodulate or process the input samples (for example, for OFDM) to obtain received symbols. The MIMO detector 356 may obtain received symbols from the set of modems 354, may perform MIMO detection on the received symbols if applicable, and may provide detected symbols. The receive processor 358 may process (for example, decode) the detected symbols, may provide decoded data for the UE 220 to the data sink 360 (which may include a data pipeline, a data queue, and/or an application executed on the UE 220), and may provide decoded control information and system information to the controller/processor 380.

For uplink communication from the UE 220 to the network node 210, the transmit processor 364 may receive and process data ("uplink data") from a data source 362 (such as a data pipeline, a data queue, and/or an application executed on the UE 220) and control information from the controller/processor 380. The control information may include one or more parameters, feedback, one or more signal measurements, and/or other types of control information. In some aspects, the receive processor 358 and/or the controller/processor 380 may determine, for a received signal (such as received from the network node 210 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a channel quality indicator (CQI) parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 220 by the network node 210.

The transmit processor 364 may generate reference symbols for one or more reference signals, such as an uplink DMRS, an uplink SRS, and/or another type of reference signal. The symbols from the transmit processor 364 may be precoded by the TX MIMO processor 366, if applicable, and further processed by the set of modems 354 (for example, for DFT-s-OFDM or CP-OFDM). The TX MIMO processor 366 may perform spatial processing (for example, precoding) on the data symbols, the control symbols, the overhead symbols, and/or the reference symbols, if applicable, and may provide a set of output symbol streams (for example, U output symbol streams) to the set of modems 354. For example, each output symbol stream may be provided to a respective modulator component (shown as MOD) of a modem 354. Each modem 354 may use the respective modulator component to process (for example, to modulate) a respective output symbol stream (for example, for OFDM) to obtain an output sample stream. Each modem 354 may further use the respective modulator component to process (for example, convert to analog, amplify, filter, and/or upconvert) the output sample stream to obtain an uplink signal.

The modems 354*a* through 354*u* may transmit a set of uplink signals (for example, R uplink signals or U uplink symbols) via the corresponding set of antennas 352. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 220) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 352 or the set of antennas 334 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 3. As used herein, “antenna” can refer to one or more antennas, one or more antenna panels, one or more antenna groups, one or more sets of antenna elements, or one or more antenna arrays. “Antenna panel” can refer to a group of antennas (such as antenna elements) arranged in an array or panel, which may facilitate beamforming by manipulating parameters of the group of antennas. “Antenna module” may refer to circuitry including one or more antennas, which may also include one or more other components (such as filters, amplifiers, or processors) associated with integrating the antenna module into a wireless communication device.

In some examples, each of the antenna elements of an antenna 334 or an antenna 352 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term “beam” may refer to a directional transmission of a wireless signal toward a receiving device or otherwise in a desired direction. “Beam” may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, width, and/or presence of side lobes) and/or the direction of a beam (such as an angle of the beam relative to a surface of an antenna array) can be dynamically controlled by modifying the phase shifts, phase offsets, and/or amplitudes of the multiple signals relative to each other.

Different UEs 220 or network nodes 210 may include different numbers of antenna elements. For example, a UE 220 may include a single antenna element, two antenna elements, four antenna elements, eight antenna elements, or a different number of antenna elements. As another example, a network node 210 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmission, in which a first layer of a communication (which may include a first data stream) and a second layer of a communication (which may include a second data stream) are transmitted using the same time and frequency resources with spatial multiplexing.

Figure 4:
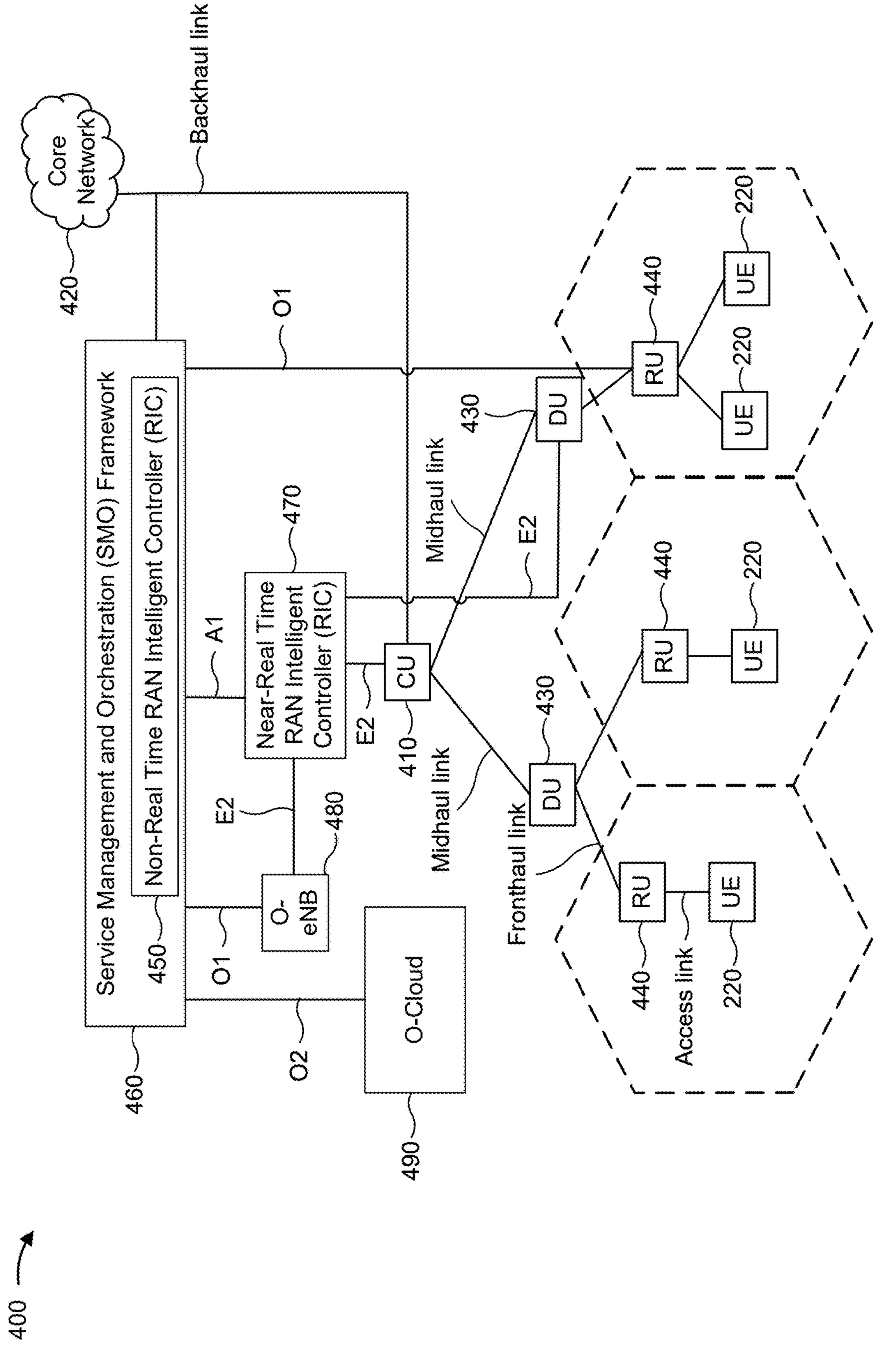
FIG. 4 is a diagram illustrating an example disaggregated base station architecture in accordance with the present disclosure.

FIG. 4 is a diagram illustrating an example disaggregated base station architecture 400 in accordance with the present disclosure. One or more components of the example disaggregated base station architecture 400 may be, may include, or may be included in one or more network nodes (such one or more network nodes 210). The disaggregated base station architecture 400 may include a CU 410 that can communicate directly with a core network 420 via a backhaul link, or that can communicate indirectly with the core network 420 via one or more disaggregated control units, such as a Non-RT RIC 450 associated with a Service Management and Orchestration (SMO) Framework 460 and/or a Near-RT RIC 470 (for example, via an E2 link). The CU 410 may communicate with one or more DUs 430 via respective midhaul links, such as via F1 interfaces. Each of the DUs 430 may communicate with one or more RUs 440 via respective fronthaul links. Each of the RUs 440 may communicate with one or more UEs 220 via respective RF access links. In some deployments, a UE 220 may be simultaneously served by multiple RUs 440.

Each of the components of the disaggregated base station architecture 400, including the CUs 410, the DUs 430, the RUs 440, the Near-RT RICs 470, the Non-RT RICs 450, and the SMO Framework 460, may include one or more interfaces or may be coupled with one or more interfaces for receiving or transmitting signals, such as data or information, via a wired or wireless transmission medium.

In some aspects, the CU 410 may be logically split into one or more CU-UP units and one or more CU-CP units. A CU-UP unit may communicate bidirectionally with a CU-CP unit via an interface, such as the E1 interface when implemented in an O-RAN configuration. The CU 410 may be deployed to communicate with one or more DUs 430, as necessary, for network control and signaling. Each DU 430 may correspond to a logical unit that includes one or more base station functions to control the operation of one or more RUs 440. For example, a DU 430 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 430, or for communicating signals with the control functions hosted by the CU 410. Each RU 440 may implement lower layer functionality. In some aspects, real-time and non-real-time aspects of control and user plane communication with the RU(s) 440 may be controlled by the corresponding DU 430.

The SMO Framework 460 may support RAN deployment and provisioning of non-virtualized and virtualized network elements. For non-virtualized network elements, the SMO Framework 460 may support the deployment of dedicated physical resources for RAN coverage requirements, which may be managed via an operations and maintenance interface, such as an O1 interface. For virtualized network elements, the SMO Framework 460 may interact with a cloud computing platform (such as an open cloud (O-Cloud) platform 490) to perform network element life cycle management (such as to instantiate virtualized network elements) via a cloud computing platform interface, such as an O2 interface. A virtualized network element may include, but is not limited to, a CU 410, a DU 430, an RU 440, a non-RT RIC 450, and/or a Near-RT RIC 470. In some aspects, the SMO Framework 460 may communicate with a hardware aspect of a 4G RAN, a 5G NR RAN, and/or a 6G RAN, such as an open eNB (O-eNB) 480, via an O1 interface. Additionally or alternatively, the SMO Framework 460 may communicate directly with each of one or more RUs 440 via a respective O1 interface. In some deployments, this configuration can enable each DU 430 and the CU 410 to be implemented in a cloud-based RAN architecture, such as a vRAN architecture.

The Non-RT RIC 450 may include or may implement a logical function that enables non-real-time control and optimization of RAN elements and resources, artificial intelligence and/or machine learning (AI/ML) workflows including model training and updates, and/or policy-based guidance of applications and/or features in the Near-RT RIC 470. The Non-RT RIC 450 may be coupled to or may communicate with (such as via an A1 interface) the Near-RT RIC 470. The Near-RT RIC 470 may include or may implement a logical function that enables near-real-time control and optimization of RAN elements and resources via data collection and actions via an interface (such as via an E2 interface) connecting one or more CUs 410, one or more DUs 430, and/or an O-eNB with the Near-RT RIC 470.

In some aspects, to generate AI/ML models to be deployed in the Near-RT RIC 470, the Non-RT RIC 450 may receive parameters or external enrichment information from external servers. Such information may be utilized by the Near-RT RIC 470 and may be received at the SMO Framework 460 or the Non-RT RIC 450 from non-network data sources or from network functions. In some examples, the Non-RT RIC 450 or the Near-RT RIC 470 may tune RAN behavior or performance. For example, the Non-RT RIC 450 may monitor long-term trends and patterns for performance and may employ AI/ML models to perform corrective actions via the SMO Framework 460 (such as reconfiguration via an O1 interface) or via creation of RAN management policies (such as A1 interface policies).

The network node 210, the controller/processor 340 of the network node 210, the UE 220, the controller/processor 380 of the UE 220, the CU 410, the DU 430, the RU 440, or any other component(s) of FIG. 1, 2, 3 or 4 may implement one or more techniques or perform one or more operations associated with TPR signaling for a control channel, as described in more detail elsewhere herein. For example, the controller/processor 340 of the network node 210, the controller/processor 380 of the UE 220, any other component(s) of FIG. 3, the CU 410, the DU 430, or the RU 440 may perform or direct operations of, for example, process 800 of FIG. 8, process 900 of FIG. 9, or other processes as described herein (alone or in conjunction with one or more other processors). The memory 342 may store data and program codes for the network node 210, the network node 210, the CU 410, the DU 430, or the RU 440. The memory 382 may store data and program codes for the UE 220. In some examples, the memory 342 or the memory 382 may include a non-transitory computer-readable medium storing a set of instructions (for example, code or program code) for wireless communication. The memory 342 may include one or more memories, such as a single memory or multiple different memories (of the same type or of different types). The memory 382 may include one or more memories, such as a single memory or multiple different memories (of the same type or of different types). For example, the set of instructions, when executed (for example, directly, or after compiling, converting, or interpreting) by one or more processors of the network node 210, the UE 220, the CU 410, the DU 430, or the RU 440, may cause the one or more processors to perform process 800 of FIG. 8, process 900 of FIG. 9, or other processes as described herein. In some examples, executing instructions may include running the instructions, converting the instructions, compiling the instructions, and/or interpreting the instructions, among other examples.

In some aspects, a first network entity includes means for transmitting, to a second network entity, first information indicative of an average TPR for a first set of one or more control channel communications; means for scaling, based on the first information, one or more codeword powers associated with a codebook to generate one or more scaled codeword powers; and/or means for communicating, with the second network entity and using the one or more scaled codeword powers, a second set of one or more control channel communications. In some aspects, the means for the first network entity to perform operations described herein may include, for example, one or more of one or more of communication manager 250, transmit processor 314, TX MIMO processor 316, modem 332, antenna 334, MIMO detector 336, receive processor 338, controller/processor 340, memory 342, or scheduler 346. In some aspects, the means for the first network entity to perform operations described herein may include, for example, one or more of one or more of communication manager 240, antenna 352, modem 354, MIMO detector 356, receive processor 358, transmit processor 364, TX MIMO processor 366, controller/processor 380, or memory 382.

In some aspects, a first network entity includes means for receiving, from a second network entity, first information indicative of an average TPR for a first set of one or more control channel communications; means for scaling, based on the first information, one or more codework powers associated with a codebook to generate one or more scaled codeword powers; and/or means for communicating, with the second network entity and using the one or more scaled codeword powers, a second set of one or more control channel communications. In some aspects, the means for the first network entity to perform operations described herein may include, for example, one or more of one or more of communication manager 250, transmit processor 314, TX MIMO processor 316, modem 332, antenna 334, MIMO detector 336, receive processor 338, controller/processor 340, memory 342, or scheduler 346. In some aspects, the means for the first network entity to perform operations described herein may include, for example, one or more of communication manager 240, antenna 352, modem 354, MIMO detector 356, receive processor 358, transmit processor 364, TX MIMO processor 366, controller/processor 380, or memory 382.

Figure 5:
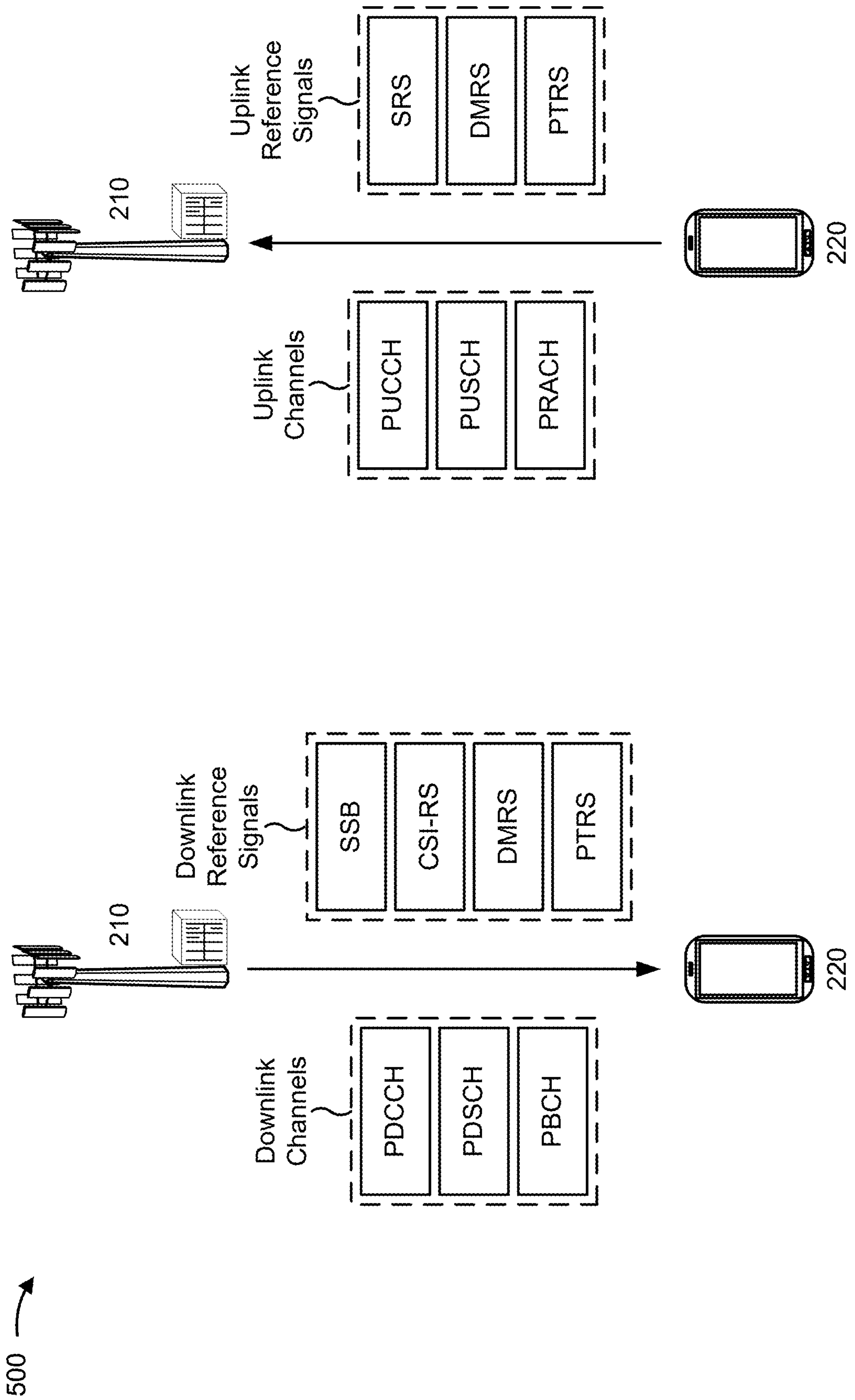
FIG. 5 is a diagram illustrating an example of physical channels and reference signals in a wireless network, in accordance with the present disclosure.

FIG. 5 is a diagram illustrating an example 500 of physical channels and reference signals in a wireless network, in accordance with the present disclosure. As shown in FIG. 5, downlink channels and downlink reference signals may carry information from a network node 210 to a UE 220, and uplink channels and uplink reference signals may carry information from a UE 220 to a network node 210.

As shown, a downlink channel may include a PDCCH that carries downlink control information (DCI), a PDSCH that carries downlink data, or a physical broadcast channel (PBCH) that carries system information, among other examples. In some aspects, PDSCH communications may be scheduled by PDCCH communications. As further shown, an uplink channel may include a PUCCH that carries uplink control information (UCI), a PUSCH that carries uplink data, or a physical random access channel (PRACH) used for initial network access, among other examples. In some aspects, the UE 220 may transmit acknowledgement (ACK) or negative acknowledgement (NACK) feedback (e.g., ACK/NACK feedback or ACK/NACK information) in UCI on the PUCCH and/or the PUSCH. The feedback may be hybrid automatic repeat request (HARQ) feedback for data transmitted via the PDSCH or another downlink channel.

As further shown, a downlink reference signal may include a synchronization signal block (SSB), a CSI-RS, a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the network node 210 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network node 210 may configure a set of CSI-RSs for the UE 220, and the UE 220 may measure the configured set of CSI-RSs. Based at least in part on the measurements, the UE 220 may perform channel estimation and may report channel estimation parameters to the network node 210 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The network node 210 may use the CSI report to select transmission parameters for downlink communications to the UE 220, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 220 based on signals transmitted by the network node 210 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 220, which may need to detect downlink signals from multiple neighboring network nodes in order to perform OTDOA-based positioning. Accordingly, the UE 220 may receive a PRS from multiple cells (e.g., a reference cell and one or more neighbor cells), and may report a reference signal time difference (RSTD) based on OTDOA measurements associated with the PRSs received from the multiple cells. In some aspects, the network node 210 may then calculate a position of the UE 220 based on the RSTD measurements reported by the UE 220.

An SRS may carry information used for uplink channel estimation, which may be used for scheduling, link adaptation, precoder selection, or beam management, among other examples. The network node 210 may configure one or more SRS resource sets for the UE 220, and the UE 220 may transmit SRSs on the configured SRS resource sets. An SRS resource set may have a configured usage, such as uplink CSI acquisition, downlink CSI acquisition for reciprocity-based operations, uplink beam management, among other examples. The network node 210 may measure the SRSs, may perform channel estimation based at least in part on the measurements, and may use the SRS measurements to configure communications with the UE 220.

The UE 220 and the network node 210 may support retransmissions of data to increase the likelihood that data is received successfully. HARQ feedback is one technique for increasing the likelihood that data is received correctly via a communication link or channel. HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise ratio conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The UE 220 may receive downlink signaling from the network node 210. The UE 220 may transmit feedback messages for the downlink signaling. For example, the UE 220 may transmit a feedback codebook (e.g., a sequence of bits that indicate feedback for one or multiple downlink transmissions), such as a HARQ ACK or NACK codebook including feedback bits indicating ACK or NACK information for the received downlink signaling. The UE 220 may transmit the feedback (e.g., the feedback codebook) via an uplink channel, such as the PUCCH. In some examples, the UE 220 may be more likely to transmit an ACK indication (e.g., bit 0) than a NACK indication (e.g., bit 1). For example, at a 10% block-error rate (BLER) in the PDSCH, the UE 220 may transmit 90% ACK indications and 10%

NACK indications. However, current codebooks are designed for uniform probability of messages with equal likelihood of the bit 0 and bit 1, and power is applied uniformly to the non-uniform messages. This results in inefficient power utilization.

As indicated above, FIG. 5 is provided as an example. Other examples may differ from what is described with regard to FIG. 5.

Figure 6:
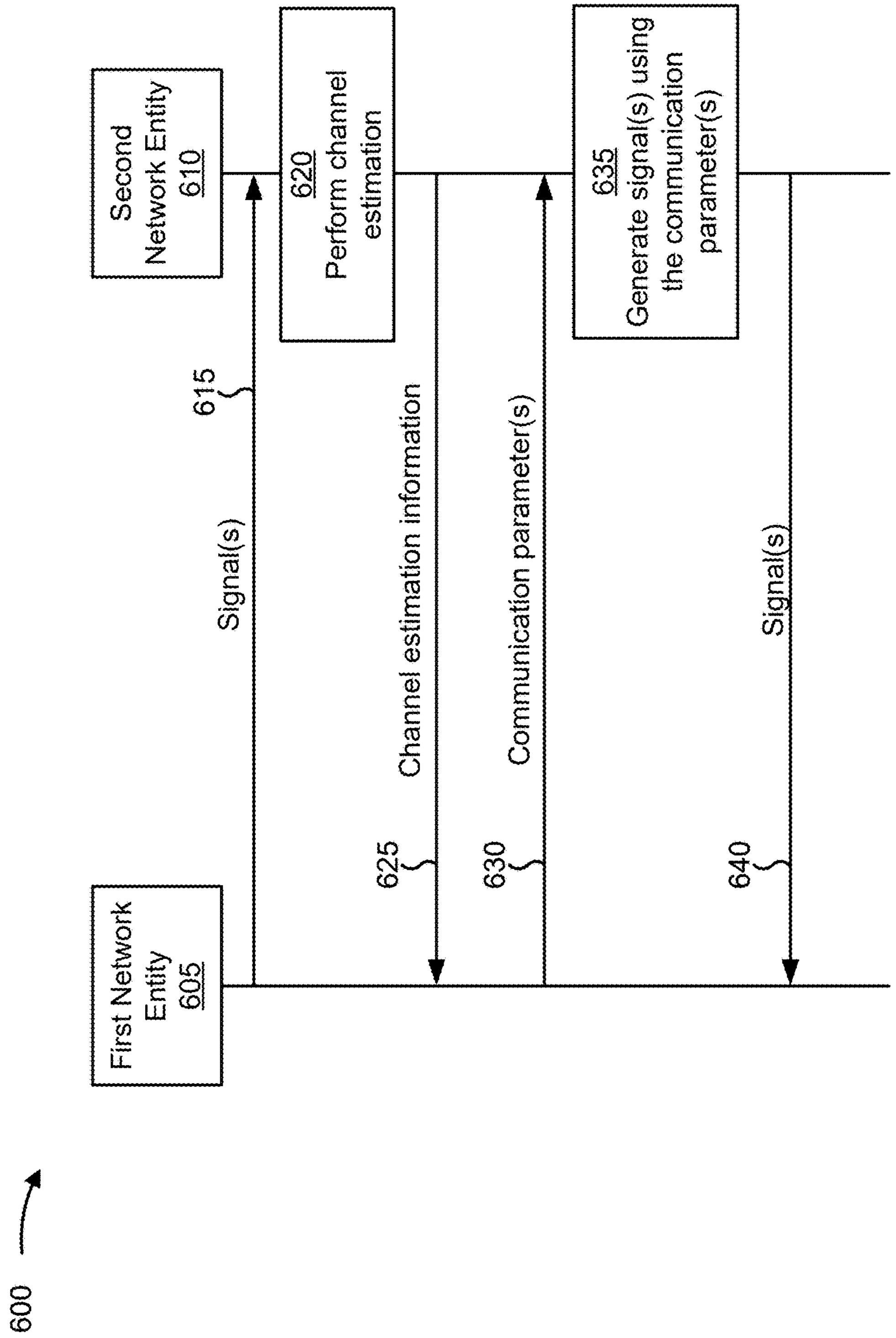
FIG. 6 is a diagram illustrating an example of link adaptation, in accordance with the present disclosure.

FIG. 6 is a diagram illustrating an example 600 of link adaptation, in accordance with the present disclosure. As shown in FIG. 6, a first network entity 605 (e.g., the network entity 102) may communicate with a second network entity 610 (e.g., the network entity 106). In some examples, the first network entity 605 may be a network node 210, and the second network entity 610 may be a UE 220. In other examples, the first network entity 605 and the second network entity 610 may be other types of wireless communication devices. The first network entity 605 and the second network entity 610 may communicate via a wireless communication network, such as the wireless communication network 200 or the network 108.

The first network entity 605 and the second network entity 610 may perform link adaptation to dynamically adjust communication parameters (e.g., transmission parameters) based on, in response to, or otherwise associated with, an estimated quality of a communication link, such as one or more communication channels (e.g., the PDSCH, the PUSCH, the PDCCH, and/or the PUCCH). For example, in a wireless communication network, channel conditions between the first network entity 605 and the second network entity 610 may vary due to one or more factors, such as a distance between the first network entity 605 and the second network entity 610, one or more obstacles in the environment (e.g., that may block or deflect transmitted beams or signals), and/or interference from other signals, among other examples. One example of link adaptation is outer-loop link adaptation (OLLA). Unlike inner-loop link adaptation, which adapts one or more parameters based on short-term variations in a channel, OLLA enables parameter adaptation based on longer-term variations, making OLLA more suitable for optimizing system performance over time.

For example, as shown by reference number 615, the first network entity 605 may transmit, and the second network entity 610 may receive, one or more signals. The one or more signals may include one or more reference signals, data signals, control signals, and/or other types of signals. The one or more signals may be transmitted via a communication channel, such as the PDSCH, the PDCCH, the PUSCH, and/or the PUCCH. As shown by reference number 620, the second network entity 610 may perform channel estimation based on, or using, the one or more signals. For example, the second network entity 610 may decode, measure, and/or otherwise process the one or more signals to estimate one or more channel estimation parameters. In some examples, the second network entity 610 may determine CSI based on measuring and/or otherwise processing the one or more signals. The one or more channel estimation parameters may include one or more CSI parameters, a CQI parameter, an RSRP parameter, an RSSI parameter, an RSRQ parameter, a TPC parameter, and/or another parameter.

As shown by reference number 625, the second network entity 610 may transmit, and the first network entity 605 may receive, channel estimation information (e.g., for the channel via which the one or more signals were transmitted as described in connection with reference number 615). The channel estimation information may include the one or more channel estimation parameters and/or CSI for the channel. For example, the channel estimation information may be included in a CSI report.

The first network entity 605 may determine, adjust, and/or set one or more communication parameters to be used by the second network entity 610 based on the channel estimation information. For example, the first network entity 605 may determine an appropriate MCS to be used by the second network entity 610 based on the channel estimation information. As another example, the first network entity 605 may determine a transmit power, one or more power control parameters, and/or a frame structure, among other examples, based on the channel estimation information. In some examples, the first network entity 605 may determine, adjust, and/or set one or more communication parameters to maintain or achieve a target error rate for data (e.g., a payload) transmitted via the channel (e.g., a target BLER). For example, the first network entity 605 may determine, adjust, and/or set one or more communication parameters based on the channel estimation information and/or based on feedback from the second network entity 610 (e.g., HARQ feedback) to maintain or achieve the target error rate.

As shown by reference number 630, the first network entity 605 may transmit, and the second network entity 610 may receive, the one or more communication parameters, such as an MCS, a transmit power, one or more power control parameters, among other examples. For example, the first network entity 605 may configure the second network entity 610 to use the one or more communication parameters. As shown by reference number 635, the second network entity 610 may generate one or more signals using the one or more communication parameters. As shown by reference number 640, the second network entity 610 may transmit, and the first network entity 605 may receive, the one or more signals (e.g., that were generated using the one or more communication parameters).

In some examples, the second network entity 610 may transmit, and the first network entity 605 may receive, feedback information. The feedback information may include HARQ feedback and/or a feedback codebook. In the context of feedback information (e.g., HARQ feedback), "codebook" refers to a set of one or more (e.g., a matrix of one or more) feedback indications (e.g., ACK or NACK indications) that can be transmitted via a single transmission (e.g., a single uplink transmission, such as via the PUCCH or the PUSCH). In some cases, a network entity (e.g., a UE) may support HARQ feedback codebook transmissions. A HARQ feedback codebook transmission may include a feedback message that the network entity is to transmit to another network entity to provide feedback regarding, for example, downlink data transmission (for example, transmissions associated with a PDSCH). The network entity may be configured with different types of codebooks, such as a Type-1 HARQ ACK codebook or a Type-2 HARQ ACK codebook. For example, the Type-1 HARQ ACK codebook may be associated with a fixed, or static, size (for example, that is configured by the network entity). The Type-2 HARQ ACK codebook may be associated with a dynamic size (for example, where the size of the Type-2 HARQ ACK codebook is based at least in part on, or otherwise associated with, scheduling received by the network entity). Typically, if the network entity is configured to transmit a Type-1 HARQ ACK codebook, the network entity may collect feedback for one or more communications (e.g., PDSCH communications) that are received by the network entity during a feedback window (for example, k time intervals, such as k slots, k subframes, or k symbols), and may transmit the Type-1 HARQ ACK codebook indicating feedback (for example, ACK/NACK feedback) associated with the PDSCH communications that are received by the network entity during the feedback window. As used herein, a codebook may be a sequence of bits, which may be constructed using ACK/NACK feedback associated with multiple communications (e.g., multiple PDSCH communications) that are received by a network entity during a feedback window. A codebook may include one or more codewords. A codeword may include a message or communication. For example, a codeword may include one or more ACK/NACK feedback indications (e.g., a sequence of one or more HARQ ACK bit values and/or HARQ NACK bit values).

As described elsewhere herein, the first network entity 605 may configure one or more communication parameters to achieve a target error rate for a given channel, such as the PDSCH. The second network entity 610 may transmit, and the first network entity 605 may receive, a codebook indicating feedback (e.g., HARQ ACK/NACK feedback) for the given channel. Because the communication parameter(s) are configured to achieve the target error rate (e.g., target BLER) for the given channel, the feedback information for the given channel will be biased and/or non-uniform. For example, if the target BLER for the PDSCH is 10%, then the probability that feedback is ACK feedback is 90% for a given communication (e.g., a given transport block) transmitted via the PDSCH. In some examples, codebooks may be designed for uniform probability of messages with equal likelihood of the bit 0 and bit 1. In such examples, power is applied uniformly to all codewords in the codebook. For example, each codeword may be transmitted using the same transmit power. This results in inefficient power usage by the network entity transmitting the codebook.

In some examples, a network entity may utilize techniques for power shaping associated with non-uniform message transmissions to improve power savings. For example, more power may be proportionally assigned to less likely symbols (e.g., less likely codewords) and less power to more likely symbols (e.g., more likely codewords) to reduce the average transmit power and improve error performance. For example, the network entity may scale a power of a codeword based on, or otherwise associated with, a probability associated with the codeword. As an example, the network entity (e.g., the second network entity 610) may perform a power scaling procedure for the codeword $c(x^k)$ based on a power scaling parameter. In some examples, the second network entity 605 may receive the power scaling parameter from the first network entity 605. In some examples, the power scaling parameter may be associated with a non-uniform probability of respective portions of the message $x^k$. For example, the power scaling procedure may use a scaling parameter of $$\log\left(\frac{1}{p(x^k)}\right),$$

where $p(x^k)$ is the non-uniform probability of the message $x^k$. The message $x^k$ may include one or more feedback indications, such as HARQ ACK indications or HARQ NACK indications, among other examples. In other words, if a codeword c has probability $\pi_c$, then the transmit power allocated to that codeword may be $P_c \propto -\log \pi_c$, where $P_c$ is a power control parameter a.

In some examples, techniques for power control for ACK/NACK transmission may scale power according to the probability of a message sequence. For example, if the message sequence $x^k$ has probability $p(x^k)$, then the power of the corresponding codeword transmission $c(x^k)$ may be scaled with $$\log\left(\frac{1}{p(x^k)}\right).$$

After normalization with respect to unit expected power over the whole codebook, message sequence $x^k$ may be mapped to $$\sqrt{\log\left(\frac{1}{p(x^k)}\right) * \frac{1}{\sum_{x^k} p(x^k)\log\left(\frac{1}{p(x^k)}\right)}} * c(x^k),$$

where the normalization parameter α is $$\frac{1}{\sum_{x^k} p(x^k)\log\left(\frac{1}{p(x^k)}\right)}.$$

Techniques for power control for the message comprising independent and identically distributed bit values may scale power according to the probability of a message sequence. If all bits are independent and identically Bernoulli distributed (Bern(p)), the probability may be $p(x^k)=p^m(1-p)^{k-m}$, where p denotes a probability of bit 1, m denotes a quantity of bit 1 in the message $x^k$, and k denotes the message length. In some cases, the normalization parameter may be simplified to $$\alpha = \sum_{x^k} p(x^k)\log\left(\frac{1}{p(x^k)}\right) = \frac{1}{kH(p)},$$

where $H(p)=-p\log(p)-(1-p)\log(1-p)$ is the entropy of Bern(p) variable and may be precomputed for a given value of p. The power scaling may be simplified to $$\alpha * \log\left(\frac{1}{p(x^k)}\right) = \frac{1}{k * H(p)}\log\left(\frac{1}{p(x^k)}\right).$$

In some examples, techniques for power control for the message comprising bits having non-identically distributed bit values may scale power according to the probability of a message sequence. In some cases, the bits may correspond to different types of contents. For example, a subset of message bits may correspond to HARQ-ACK and another subset may correspond to a scheduling request (SR).

In some examples, a network entity (e.g., a UE) may estimate channel information (e.g., as described above) using a pilot. "Pilot" may refer to a known signal, such as a reference signal. To ensure reliable channel estimation, one or more network entities may use a TPR. The TPR indicates a ratio between a first transmit power of pilot signals transmitted via a channel and a second transmit power of data (or payload) signals transmitted via the channel (e.g., a ratio between the power allocated to data traffic and the power allocated to the pilot signals for a given channel). The TPR may impact channel estimation accuracy, beamforming performance, spectral efficiency, interference mitigation, and/or dynamic resource allocation, among other examples. In examples where a codebook uses uniform power for all codewords, the TPR may be a static value. For example, the TPR may be based on a quantity of CDM groups per resource element in a pilot signal (e.g., a DMRS) as compared to a quantity of CDM groups per resource element in data traffic. As an example, for the PUCCH, where the pilot signal (e.g., the DMRS) and data traffic both have the rank 1, the TPR may be 0 decibels (dB). However, where power scaling or power shaping is applied to vary the transmit power for codewords in a codebook (e.g., based on the nonuniform probabilities of respective codewords), the TPR may vary over time based on the power scaling or power shaping being applied. As a result, network entities that are communicating may be unaware of a TPR for a given channel at a given time. The varying TPR (e.g., that may have a value different than 0 dB) may negatively impact the performance of channel estimation accuracy, beamforming performance, spectral efficiency, interference mitigation, and/or dynamic resource allocation, among other examples.

As indicated above, FIG. 6 is provided as an example. Other examples may differ from what is described with regard to FIG. 6.

Figure 7:
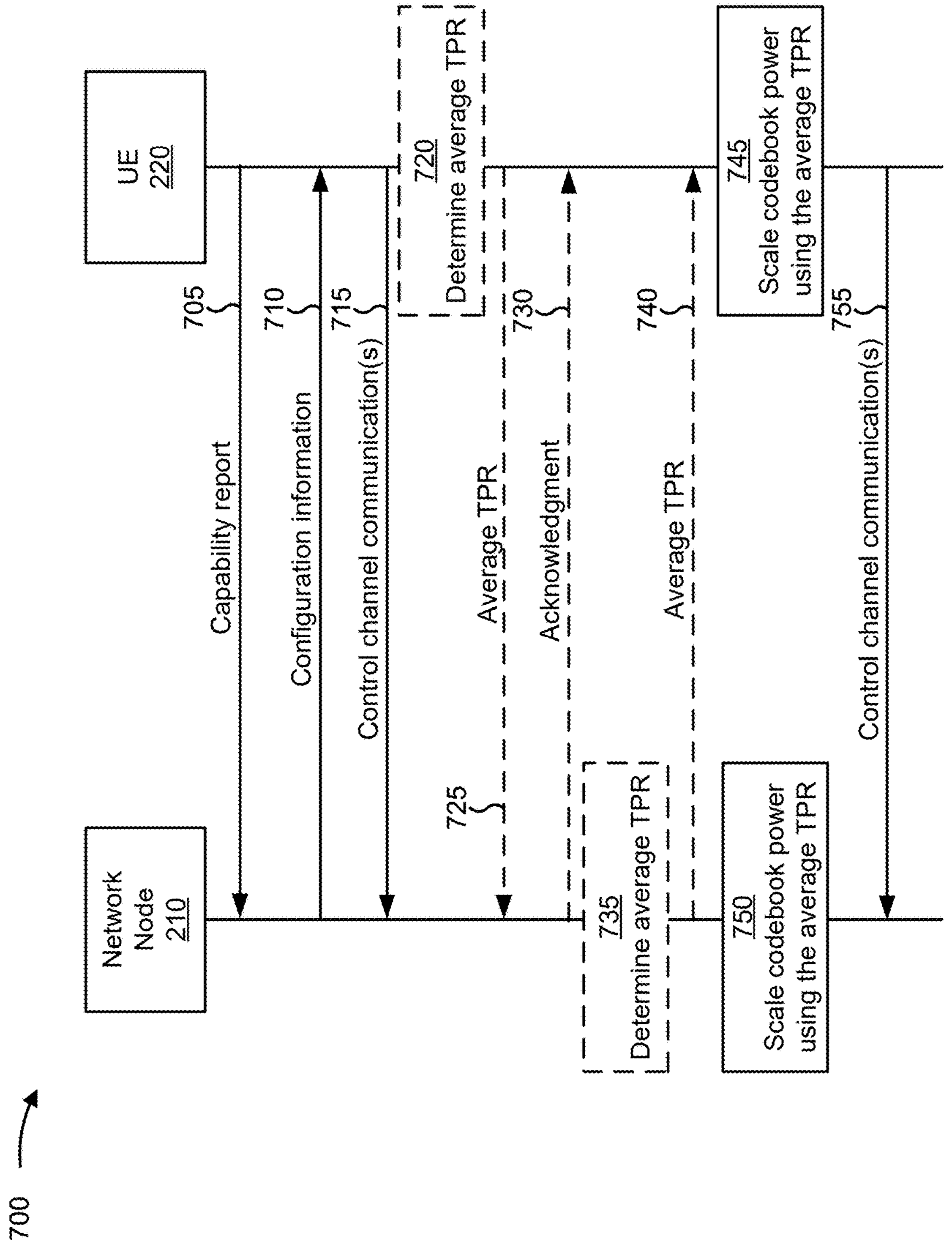
FIG. 7 is a diagram of an example associated with traffic-to-pilot ratio (TPR) signaling for control channels, in accordance with the present disclosure.

FIG. 7 is a diagram of an example 700 associated with TPR signaling for control channels, in accordance with the present disclosure. As shown in FIG. 7, a network node 210 (e.g., the network entity 102, the network entity 104, the network entity 106, a base station, a CU, a DU, and/or an RU) may communicate with a UE 220 (e.g., the network entity 102, the network entity 104, or the network entity 106). In some aspects, the network node 210 and the UE 220 may be part of a wireless network (e.g., the wireless communication network 200). The UE 220 and the network node 210 may have established a wireless connection prior to operations shown in FIG. 7.

Although some examples are described herein in connection with uplink control channel communications, the techniques described herein (e.g., for TPR signaling and/or codebook scaling) may be similarly applied to other types of communications that use codebooks associated with per-codeword power shaping (e.g., sidelink communications, downlink communications, peer-to-peer communications, machine-type communications, or other types of communications). In examples where the TPR signaling and/or codebook scaling is performed in association with a sidelink channel, the UE 220 may transmit information indicative of the average TPR to another UE 220 (not shown in FIG. 7), rather than to the network node 210 (e.g., as shown in FIG. 7 and by reference number 725, described in more detail elsewhere herein).

In some aspects, as shown by reference number 705, the UE 220 may transmit, and the network node 210 may receive, a capability report. The UE 220 may transmit the capability report via an uplink communication, a UE assistance information (UAI) communication, an uplink control information (UCI) communication, an uplink MAC control element (MAC-CE) communication, an RRC communication, a PUCCH (e.g., a PUCCH communication), and/or a PUSCH (e.g., a PUSCH communication), among other examples. The capability report may include capability information indicative of one or more capabilities of the UE 220. The capability report may indicate one or more parameters associated with respective capabilities of the UE 220. The one or more parameters may be indicated via respective information elements (IEs) included in the capability report.

The capability report may indicate whether the UE supports a feature and/or one or more parameters related to the feature. For example, the capability report may indicate a capability and/or parameter for supporting TPR reporting associated with a channel (e.g., an uplink control channel, such as the PUCCH). As another example, the capability report may indicate a capability and/or parameter for supporting a per-codeword power shaping codebook for the channel. One or more operations described herein may be based on, or otherwise associated with, capability information of the capability report. For example, the UE may perform a communication in accordance with the capability information, or may receive configuration information that is in accordance with the capability information. In some aspects, the capability report may indicate UE support for scaling or modifying the per-codeword power shaping codebook based on, or otherwise associated with, an average TPR for the channel. The capability report may indicate UE support for one or more operations (e.g., performed by the UE 220) described herein.

As shown by reference number 710, the network node 210 may transmit, and the UE 220 may receive, configuration information. In some aspects, the UE 220 may receive the configuration information via one or more of system information signaling (e.g., a master information block (MIB) and/or a system information block (SIB), among other examples), RRC signaling, MAC signaling (e.g., one or more MAC-CEs), and/or DCI, among other examples.

In some aspects, the configuration information may indicate one or more candidate configurations and/or communication parameters. In some aspects, the one or more candidate configurations and/or communication parameters may be selected, activated, and/or deactivated by a subsequent indication. For example, the subsequent indication may select a candidate configuration and/or communication parameter from the one or more candidate configurations and/or communication parameters. In some aspects, the subsequent indication (e.g., an indication described herein) may include a dynamic indication, such as one or more MAC-CEs and/or one or more DCI messages, among other examples.

In some aspects, the configuration information may indicate that the UE 220 is to communicate (e.g., transmit) uplink control channel communications using the per-codeword power shaping codebook. For example, the configuration information may include a configuration for the uplink control channel (e.g., a PUCCH configuration). The configuration information may configure one or more uplink control channel (e.g., PUCCH) rate tuples $r_i=(k_i, n_i)$, where $k_i$ is a quantity of information bits, and $n_i$ is the quantity of resources allocated for PUCCH transmission (e.g., quantity of frequency domain resources (e.g., subcarriers, resource blocks, and/or resource elements) and/or quantity of time domain resources (e.g., symbols).

For each PUCCH rate tuple, the configuration information may indicate a codebook. The codebook may be a per-codeword power shaping codebook. In other words, the codebook may be associated with power shaping parameters for respective codewords included in the codebook (e.g., each codeword may have a separate or dedicated power shaping parameter to define a power to be allocated to that codeword). For example, the codebook may be represented as $\mathcal{C}_i=[\sqrt{P_{i,1}}c_{i,1}, \ldots, \sqrt{P_{i,2^k}}c_{i,2^{k_i}}]$, where $P_{i,j}$ represents the power shaping parameter for the codebook i and the codeword j, and $c_{i,j}$ represents the codeword j for the codebook i, where the codebook i includes $2^k$ codewords (e.g., where k is the quantity of information bits for the codebook i).

As described elsewhere herein, a value of a power shaping parameter (e.g., $P_{i,j}$) may be configured or determined based on, or otherwise associated with, a probability of a corresponding codework being included in a PUCCH communication. For example, the UE 220 may transmit the codebook i via one or more uplink control channel communications (e.g., in PUCCH data). The PUCCH data may include M unique codewords from the codebook i, where $M \leq \Sigma_i 2^{k_i}$.

In some aspects, the configuration information may indicate that the UE 220 is to scale the codebook(s) (e.g., the codebook i) based on, or otherwise associated with, a determined or reported TPR associated with the uplink control channel. In some aspects, the configuration information may indicate that the UE 220 is to determine (e.g., calculate) the average TPR for one or more uplink control channel communications (e.g., transmissions). In such examples, the configuration information may indicate that the UE 220 is to transmit an indication of the average TPR to the network node 210. In other examples, the configuration information may indicate that the UE 220 is to receive an indication of the average TPR from the network node 210.

The UE 220 may configure itself based at least in part on the configuration information. In some aspects, the UE 220 may be configured to perform one or more operations described herein based at least in part on the configuration information.

In some aspects, the configuration information described in connection with reference number 710 and/or the capability report may include information transmitted via multiple communications. Additionally, or alternatively, the network node 210 may transmit the configuration information, or a communication including at least a portion of the configuration information, before and/or after the UE 220 transmits the capability report.

In some examples, the UE 220 may receive, and the network node 210 may transmit, an indication to initiate TPR reporting and/or codebook scaling for the uplink control channel. For example, the network node 210 may transmit an RRC communication, a MAC-CE communication, and/or a DCI communication that triggers the UE 220 to begin TPR reporting and/or codebook scaling for the uplink control channel, as described in more detail elsewhere herein.

As shown by reference number 715, the UE 220 may transmit, and the network node 210 may receive, one or more control channel communications (e.g., transmissions). The one or more control channel communications may be uplink control channel communications (e.g., PUCCH communication) or another type of control channel communication. The one or more control channel communications may include data (e.g., control information, UCI, feedback information, and/or a feedback codebook) and pilot signals (e.g., one or more DMRSs). The one or more control channel communications may be transmitted (e.g., by the UE 220) and/or received (e.g., by the network node 210) using a codebook, such as a per-codeword power shaping codebook (e.g., the codebook $\mathcal{C}_i$). For example, the UE 220 may encode the data included in the one or more uplink control channel communications (e.g., the control information, UCI, and/or the feedback information) into one or more bits (e.g., information bits). The UE 220 may map the encoded bits onto one or more codewords selected from the codebook $\mathcal{C}_i$. The UE 220 may modulate the one or more codewords onto modulated symbols (e.g., codeword symbols). The UE 220 may transmit the modulated codeword symbols in the one or more uplink control channel communications (e.g., where the modulated codeword symbols are allocated to frequency domain resources (e.g., subcarriers) and time domain resources (e.g., symbols) within a set of one or more resource blocks configured for the uplink control channel). The network node 210 may receive the codeword symbols and may demodulate and/or decode the codeword symbols using the codebook $\mathcal{C}_i$.

An average TPR for the one or more uplink channel communications can be determined (e.g., calculated). In some examples, as shown by reference number 720, the UE 220 may determine (e.g., calculate) the average TPR. In such examples, as shown by reference number 725, the UE 220 may transmit, and the network node 210 may receive, an indication of the average TPR for the one or more uplink control channel communications. In some examples, as described in more detail elsewhere herein, the network node 210 may transmit, and the UE 220 may receive, an acknowledgement communication indicating that the average TPR was successfully received by the network node 210, as shown by reference number 730.

Alternatively, the network node 210 may determine (e.g., calculate) the average TPR. In such examples, as shown by reference number 740, the network node 210 may transmit, and the UE 220 may receive, an indication of the average TPR.

The average TPR may indicate (e.g., may represent or be a measure of) an average amount by which an average power of the data included in the uplink control channel communication(s) differs from the average power of the pilot signal(s) (e.g., DMRS) included in the uplink control channel communication(s) (e.g., may be a measure of a power "overage" of the data as compared to the DMRS(s) included in the uplink control channel communication(s)).

For example, the data may include the M unique codewords from the codebook $\mathcal{C}_i$, where $M \leq \Sigma_i 2^{k_i}$. For each codeword included in the M unique codewords, the power scaling factor may be a function of the codeword. Each codeword may be associated with a respective probability (e.g., probability of being included in a transmitted uplink control channel communication). For example, the probabilities may be represented as $\Pi = [\pi_1, \ldots, \pi_M]$, where $\pi_m$ is a probability of a codeword m. Each codeword may be associated with a power shaping parameter $P_{i,j}$, where i is a function of the codeword m (e.g., f(m)) and j is a function of the codeword m (e.g., g(m)).

The average transmitted power (e.g., for a give codeword symbol) of uplink control channel data may be $\overline{P}_{Data} = \Sigma_{m \in [M]} \pi_m P_{f(m),g(m)}$. For example, the average transmitted power of uplink control channel data may be a summation, for each unique codeword, of the power shaping parameter of a codeword multiplied by the probability of that codeword. Because power control (e.g., at a transmitter, such as the UE 220) is not applied to pilot signals (e.g., DMRS) in the uplink control channel communications, the average transmit value of the pilot signals can be represented as a constant value, such as 1 (one). Therefore, the average TPR for the uplink control channel communication(s) can be represented (e.g., in dB) as $\overline{P}_{Data} = 10 \log_{10} \Sigma_{i \in [M]} \pi_m P_{f(m),g(m)}$.

In some aspects, such as when the UE 220 determines the average TPR (e.g., as shown by reference number 720), the average TPR can be determined (e.g., computed) from, using, based on, or otherwise associated with the average transmit power of the data included in the one or more uplink control channel communications. For example, the UE 220 may determine the average transmit power of the data included in the one or more uplink control channel communications. The average TPR may be based on a first average transmit power of data included in the one or more uplink control channel communications and a second average transmit power of a reference signal (e.g., pilot signal or DMRS) included in the one or more uplink control channel communications. As described above, the second average transmit power (e.g., of the reference signal) can be represented as a constant value, such as 1. Therefore, the average TPR may be based on the first average transmit power of the data. For example, the average TPR may be $\overline{P}_{Data}=10\log_{10}\Sigma_{i\in[M]}\pi_m P_{f(m),g(m)}$.

As another example, such as when the network node 210 determines the average TPR (e.g., as shown by reference number 735), the average TPR can be determined (e.g., computed) from, using, based on, or otherwise associated with the average receive power of the data included in the one or more uplink control channel communications. For example, the network node 210 may estimate the average TPR using the receive power of the data and the receive power of the pilot signal or reference signal (e.g., the DMRS) included in the one or more uplink control channel communications. For example, the network node 210 may determine (e.g., estimate) the average TRP as $10\log_{10}\overline{P}_{Data}/\overline{P}_{DMRS}$, where $\overline{P}_{Data}$ is the average receive power of the data included in the one or more uplink control channel communications, and $\overline{P}_{DMRS}$ is the average receive power of the pilot signal or reference signal (e.g., the DMRS) included in the one or more uplink control channel communications. For example, the network node 210 may measure the average receive power of the data included in the one or more uplink control channel communications and the average receive power of the pilot signal or reference signal (e.g., the DMRS) included in the one or more uplink control channel communications.

The entity (e.g., the UE 220 or the network node 210) that determines the average TRP may transmit information indicative of the average TRP. The information may include a parameter, an information element, an index, or other information that is indicative of the average TPR. In some aspects, the information may include the average TPR.

The average TPR (e.g., indicated via signaling between the UE 220 and the network node 210) may be a quantized value (e.g., a quantized estimate of the average TPR). For example, the information may be indicative of the quantized value. "Quantization" may refer to the process of approximating a continuous range of values using a finite set of discrete values. For example, when the average TPR is quantized, the entity (e.g., the UE 220 or the network node 210) that determines the average TRP may round or approximate the average TPR to a discrete value from a set of discrete values (e.g., a set of quantized values).

The entity (e.g., the UE 220 or the network node 210) that determines the average TRP may transmit the information indicative of the average TRP based on, in response to, or otherwise associated with an event, such as if MAC signaling is used to transmit the information indicative of the average TRP. For example, the entity (e.g., the UE 220 or the network node 210) may transmit the information indicative of the average TRP aperiodically, such as when the event occurs. The event may include the average TPR (e.g., an absolute value of the quantized value) satisfying a threshold. For example, the entity (e.g., the UE 220 or the network node 210) may determine that the average TPR (e.g., an absolute value of the quantized value) satisfies the threshold. As an example, the entity (e.g., the UE 220 or the network node 210) may determine that the average TPR (e.g., an absolute value of the quantized value) is greater than or equal to the threshold. The entity (e.g., the UE 220 or the network node 210) may transmit the information indicative of the average TRP based on, in response to, or otherwise associated with the average TPR (e.g., an absolute value of the quantized value) satisfying the threshold. This conserves signaling overhead, network resources, and/or processing resources that would have otherwise been used to transmit information indicative of the average TRP when the average TRP has a relatively small value or is relatively close to a target TPR (e.g., zero (0) dB).

As shown by reference number 725, the UE 220 may transmit, and the network node 210 may receive, the information indicative of the average TPR. The UE 220 may transmit the information indicative of the average TRP using RRC signaling, MAC signaling, and/or UCI signaling, among other examples. For example, the UE 220 may transmit one or more uplink MAC-CEs that include the information that is indicative of the average TRP.

The UE 220 may transmit, and the network node 210 may receive, the information indicative of the average TPR (e.g., the quantized value indicative of the average TPR). In some examples, the UE 220 may transmit, and the network entity 210 may receive, a request for radio resources (e.g., to be used to transmit the information indicative of the average TPR). For example, the UE 220 may transmit, and the network entity 210 may receive, a scheduling request communication.

The network node 210 may determine an allocation of one or more radio resources for the UE 220 based on, in response to, or otherwise associated with receiving the request for radio resources. The network node 210 may transmit, and the UE 220 may receive, a communication that indicates one or more radio resources available for the UE 220. For example, network node 210 may transmit, and the UE 220 may receive, a grant indicative of one or more radio resources (e.g., time domain resources, frequency domain resources, code domain resources, and/or spatial domain resources) available for use by the UE 220 (e.g., the one or more radio resources may be allocated for the UE 220). The one or more radio resources may be uplink resources, data channel resources, control channel resources, shared channel resources (e.g., PUSCH resources), and/or MAC resources (e.g., resources to be used to transmit one or more MAC-CEs), among other examples. The UE 220 may transmit, and the network node 210 may receive, the information indicative of the average TPR via the one or more radio resources. For example, the UE 220 may transmit a MAC-CE (e.g., that includes the information) via the one or more radio resources.

As another example, the UE 220 may transmit, and the network node 210 may receive, the information indicative of the average TPR (e.g., the quantized value indicative of the average TPR) via physical layer signaling. For example, the UE 220 may transmit, and the network node 210 may receive, the information indicative of the average TPR (e.g., the quantized value indicative of the average TPR) via control information. For example, the UE 220 may transmit the information indicative of the average TPR via uplink control information, sidelink control information, or another type of control information. The control information may be associated with a format or type, such as a UCI type or UCI format. The information indicative of the average TPR may be included in a field of the format or type (e.g., a legacy format or legacy type that includes a new or modified field in which the information indicative of the average TPR is included). As another example, the format or type may be associated with TPR signaling (e.g., may be a format or type that is designed or configured for TPR signaling).

In some aspects, as shown by reference number 730, the network node 210 may transmit, and the UE 220 may receive, an acknowledgement communication that confirms that the information (e.g., indicative of the average TPR) was successfully received by the network node 210. For example, as described above, the UE 220 may transmit, and the network node 210 may receive, the information indicative of the average TPR (e.g., the quantized value indicative of the average TPR) via physical layer signaling. Physical layer signaling (e.g., UCI signaling) is typically not associated with feedback (e.g., ACK or NACK communications). As shown by reference number 730, the network node 210 may transmit, and the UE 220 may receive, an acknowledgement communication that confirms that the information (e.g., indicative of the average TPR) was successfully received by the network node 210, such as when the UE 220 transmits the information indicative of the average TPR via MAC signaling and/or physical layer signaling (e.g., UCI signaling). This enables the UE 220 to identify that the network node 210 has received the information indicative of the average TPR and can correctly scale the codebook used for control channel communications between the UE 220 and the network node 210. For example, the acknowledgement communication enables the UE 220 to identify that the UE 220 and the network node 210 are synchronized on the average TPR to be used to determine a scaling factor for the codebook, as described in more detail elsewhere herein.

In some other aspects, as shown by reference number 740, the network node 210 may transmit, and the UE 220 may receive, the information indicative of the average TPR, such as when the network node 210 determines the average TPR (e.g., as shown by reference number 735). The network node 210 may transmit the information indicative of the average TRP using RRC signaling, MAC signaling, and/or physical layer signaling (e.g., DCI signaling), among other examples. For example, the network node 210 may transmit one or more MAC-CEs that include the information that is indicative of the average TRP. For example, the network node 210 may transmit the information indicative of the average TPR via one or more downlink MAC-CEs. The network node 210 may transmit the one or more downlink MAC-CEs via one or more PDSCH transmissions.

As another example, the network node 210 may transmit, and the UE 220 may receive, the information indicative of the average TPR (e.g., the quantized value indicative of the average TPR) via physical layer signaling. For example, the network node 210 may transmit, and the UE 220 may receive, the information indicative of the average TPR (e.g., the quantized value indicative of the average TPR) via control information. For example, the network node 210 may transmit the information indicative of the average TPR via downlink control information or another type of control information. The control information may be associated with a format or type, such as a DCI type or DCI format. The information indicative of the average TPR may be included in a field of the format or type (e.g., a legacy format or legacy type that includes a new or modified field in which the information indicative of the average TPR is included). As another example, the format or type may be associated with TPR signaling (e.g., may be a format or type that is designed or configured for TPR signaling).

In some aspects, the format or type may be a DCI format. In some aspects, the DCI format may be a group-common DCI format. For example, the information indicative of the TPR may be included in a group-common DCI communication. In some aspects, the DCI format may be associated with indicating power control (or power shaping) information. In some aspects, the DCI format may be associated with indicating power control (or power shaping) information for uplink communications. The DCI format may be a DCI format 2-2 (e.g., as defined, or otherwise fixed, by a wireless communication standard, such as the 3GPP) or another group-common DCI format. For example, DCI format 2-2 may be used to signal a transmit power control (TPC) command for uplink communications. For example, the DCI may be scrambled by a TPC radio network temporary identifier (RNTI), such as a TPC-PUSCH-RNTI or a TPC-PUCCH-RNTI. The DCI may include TPC fields for respective UEs. In some aspects, the DCI may include TPR fields for respective UEs (e.g., including the UE 220). The TPR field(s) may include the information that is indicative of the average TPR. The TPR field(s) may be included in a DCI format 2-2 or another DCI format. The TPR field(s) may be only applicable to data included in control channel communications (e.g., the TPR field(s) may be applicable to power control for control channel data transmissions, but not for control channel reference signal or pilot transmissions).

In some aspects, the network node 210 may transmit, and the UE 220 may receive, one or more RRC communications that include the information that is indicative of the average TPR. For example, an RRC parameter or field (e.g., an RRC information element) may include the information that is indicative of the average TPR. The RRC parameter or field may be included in RRC signaling that is specific to TPR signaling. Alternatively, the RRC parameter or field may be included in another type of RRC signal or communication.

In some aspects, the UE 220 may transmit, and the network node 210 may receive, an acknowledgement communication that confirms that the information (e.g., indicative of the average TPR) was successfully received by the UE 220. For example, as described above, the network node 210 may transmit, and the UE 220 may receive, the information indicative of the average TPR (e.g., the quantized value indicative of the average TPR) via physical layer signaling. Physical layer signaling (e.g., UCI signaling) is typically not associated with feedback (e.g., ACK or NACK communications). The UE 220 may transmit, and the network node 210 may receive, an acknowledgement communication that confirms that the information (e.g., indicative of the average TPR) was successfully received by the UE 220, such as when the network node 210 transmits the information indicative of the average TPR via MAC signaling and/or physical layer signaling (e.g., DCI signaling). This enables the network node 210 to identify that the UE 220 has received the information indicative of the average TPR and can correctly scale the codebook used for control channel communications between the UE 220 and the network node 210. For example, the acknowledgement communication enables the network node 210 to identify that the UE 220 and the network node 210 are synchronized on the average TPR to be used to determine a scaling factor for the codebook, as described in more detail elsewhere herein.

As shown by reference number 745, the UE 220 may scale, using the information that is indicative of the average TPR, one or more codebook powers of the codebook (e.g., which may be referred to herein as "scaling the codebook") to generate one or more scaled codeword powers (e.g., a codebook with scaled codeword power(s) may be referred to as a "scaled" codebook). For example, the UE 220 may scale, using the information, one or more codeword powers associated with a codebook to generate one or more scaled codeword powers. The one or more codeword powers may be based on, defined by, or otherwise associated with the power shaping parameters for respective codewords included in the codebook. In other words, "scaled codebook" may refer to the codebook with scaled power shaping parameters. For example, the dedicated power shaping parameters for each codeword may enable the UE 220 to perform digital and/or fine-grained power control for the codewords of the codebook. The scaling described herein (e.g., based on the average TPR) may enable the UE 220 to perform analog power control for the codewords of the codebook (e.g., because the same scaling factor is applied to the transmit powers of the codewords).

For example, a transmit power of the codebook may be based on, or otherwise associated with, the average TPR (e.g., the quantized value of the average TPR). In some aspects, the UE 220 may scale a transmit power of data transmissions (e.g., PUCCH data) included in one or more control channel communications. The scaling of the transmit power may be based on, or otherwise associated with, the average TPR (e.g., the quantized value of the average TPR). In some aspects, the UE 220 may scale the transmit power of the data transmissions by the average TPR (e.g., by the quantized value of the average TPR).

In some aspects, the UE 220 may scale the power shaping parameters of the codebook based on the average TPR. For example, the UE 220 may determine a scaling factor based on, or otherwise associated with, the average TPR. For example, the scaling factor may be $10^{-\Delta_{\Pi,q}/20}$, where $\Delta_{\Pi,q}$ is the quantized value of the average TPR. For example, the power shaping parameters may be $\{\sqrt{P_{i,1}}, \ldots, \sqrt{P_{i,2^k}}\}$ for the codebook $\mathcal{C}_i$ that includes $2^k$ codewords. As an example, the UE 220 may scale the codebook by multiplying the square root of each power shaping parameter by the scaling factor (e.g., the power shaping parameters for the codebook may be scaled by $(10^{-\Delta_{\Pi,q}/20})\times(\sqrt{P_{i,1}}, \ldots, \sqrt{P_{i,2^k}})$). As another example, the scaling factor may be $10^{-\Delta_{\Pi,q}/10}$ if the power shaping parameters are scaled (rather than the square root of the power shaping parameters).

For example, the scaled codebook may be associated with power shaping parameters for respective codewords included in the codebook. The codebook may be scaled to generate a scaled codebook by scaling one or more codeword powers of the codebook. For example, the UE 220 may scale the power shaping parameters (e.g., using the scaling factor). In other words, the codebook and the "scaled" codebook may include the same codebook, but with different (e.g., scaled) power shaping parameters (e.g., where the power shaping parameters of the scaled codebook are scaled from the power shaping parameters of the codebook). The scaled codebook may be associated with power shaping parameters in that the power shaping parameters (e.g., scaled power shaping parameters) may indicate (e.g., define) respective codeword powers (e.g., transmit powers) for each respective codeword included in the scaled codebook. The UE 220 may scale the codeword powers based on the average TPR (e.g., based on the scaling factor). In other words, the UE 220 may transmit a codeword using a transmit power that is determined (e.g., calculated or indicated) using a power shaping parameter (e.g., a scaled power shaping parameter) that is specific to that codeword. For example, the scaled codebook (and/or the codebook) may include one or more codewords. The codewords may be associated with respective power shaping parameters (e.g., dedicated power shaping parameters for each codeword in the scaled codebook).

As shown by reference number 750, the network node 210 may scale the codebook power using the average TPR. For example, the network node 210 may scale the codebook and/or the codeword powers (e.g., the power shaping parameters) in a similar manner as described in connection with reference number 745. The network node 210 may scale the codebook power(s) prior to decoding one or more uplink control channel communications.

As shown by reference number 755, the UE 220 may transmit, and the network node 210 may receive, one or more control channel communications. The UE 220 may transmit (e.g., encode), and the network node 210 may receive (e.g., decode) the one or more control channel communications using the codebook and the scaled codeword powers associated with the codebook. For example, the codebook for the one or more control channel communications depicted and described in connection with reference number 755 may be associated with a respective scaled power shaping parameter (e.g., scaled based on the average TPR and/or using the scaling factor) for each respective codeword included in the codebook. As a result, the TPR for the one or more control channel communications depicted and described in connection with reference number 755 may have a higher likelihood of being a target TPR, such as zero (0) dB. This may enable the network node 210 and/or the UE 220 to perform channel estimation with improved accuracy and/or improved reliability, improved beamforming performance, improved spectral efficiency, improved interference mitigation, and/or improved dynamic resource allocation, among other examples, using the one or more control channel communications depicted and described in connection with reference number 755, because the one or more control channel communications may have the target TPR (e.g., 0 dB or close to 0 dB).

As indicated above, FIG. 7 is provided as an example. Other examples may differ from what is described with respect to FIG. 7.

Figure 8:
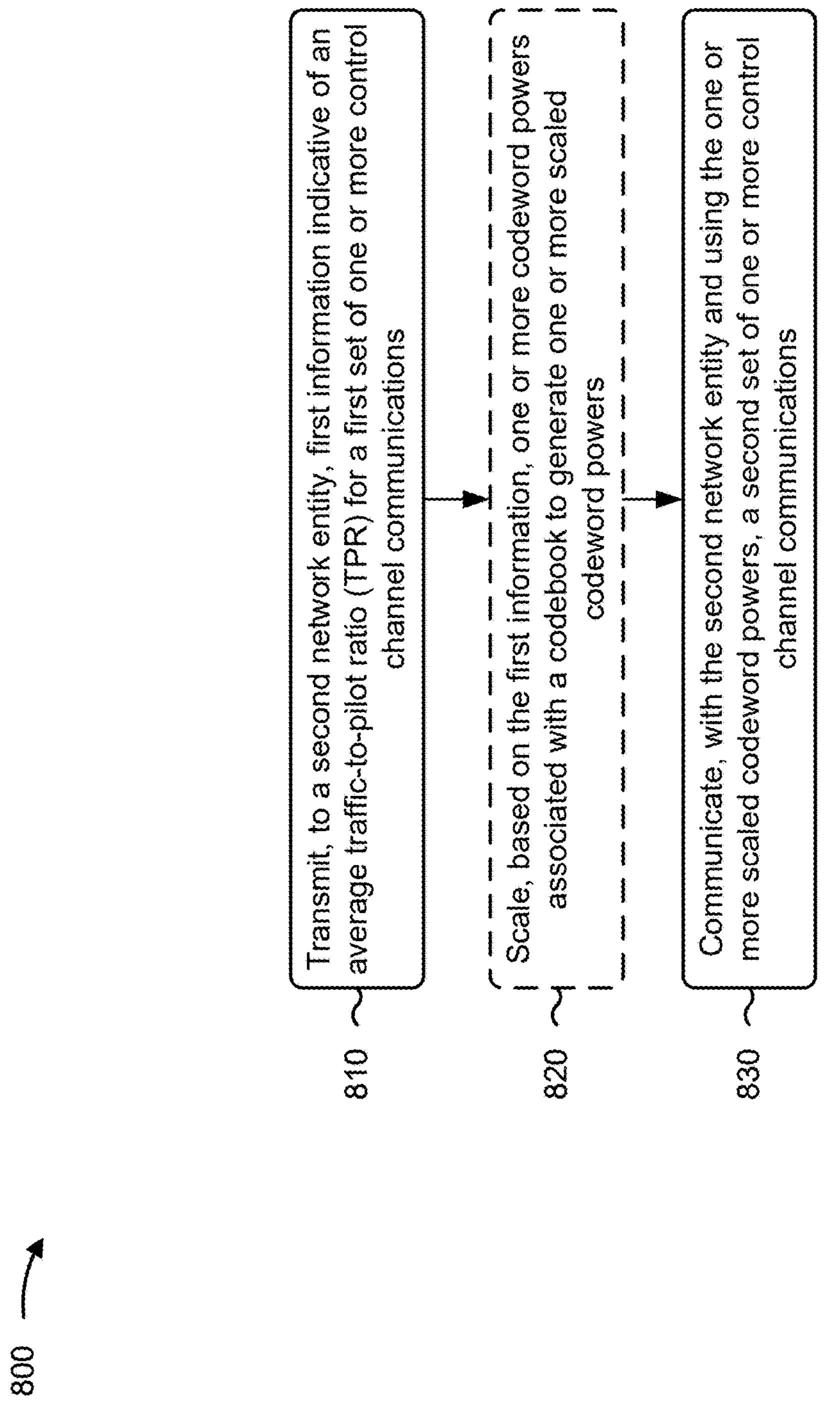
FIG. 8 is a diagram illustrating an example process performed, for example, at a first network entity or an apparatus of a first network entity, in accordance with the present disclosure.

FIG. 8 is a diagram illustrating an example process 800 performed, for example, at a first network entity or an apparatus of a first network entity, in accordance with the present disclosure. Example process 800 is an example where the apparatus or the first network entity (e.g., the network entity 102, the network entity 106, the UE 220, or the network node 210) performs operations associated with TPR signaling for control channels.

As shown in FIG. 8, in some aspects, process 800 may include transmitting, to a second network entity, first information indicative of an average TPR for a first set of one or more control channel communications (block 810). For example, the first network entity (e.g., using transmission component 1004 and/or communication manager 1006, depicted in FIG. 10) may transmit, to a second network entity, first information indicative of an average TPR for a first set of one or more control channel communications, as described above.

As further shown in FIG. 8, in some aspects, process 800 may optionally include scaling, based on the first information, one or more codeword powers associated with a codebook to generate one or more scaled codeword powers (block 820). For example, the first network entity (e.g., using communication manager 1006, depicted in FIG. 10) may scale, based on the first information, one or more codeword powers associated with a codebook to generate one or more scaled codeword powers, as described above.

As further shown in FIG. 8, in some aspects, process 800 may include communicating, with the second network entity and using the one or more scaled codeword powers, a second set of one or more control channel communications (block 830). For example, the first network entity (e.g., using reception component 1002, transmission component 1004, and/or communication manager 1006, depicted in FIG. 10) may communicate, with the second network entity and using the one or more scaled codeword powers, a second set of one or more control channel communications, as described above.

Process 800 may include additional aspects, such as any single aspect or any combination of aspects described below and/or in connection with one or more other processes described elsewhere herein.

In a first aspect, the average TPR is a ratio between a first average transmit power of data included in the first set of one or more control channel communications, and a second average transmit power of a reference signal included in the first set of one or more control channel communications.

In a second aspect, alone or in combination with the first aspect, the one or more codeword powers are associated with power shaping parameters for respective codewords included in the codebook.

In a third aspect, alone or in combination with one or more of the first and second aspects, process 800 includes transmitting, using the codebook and the one or more codeword powers, data, wherein the data is included in the one or more control channel communications, and wherein the average TPR is based on an average transmit power of the data.

In a fourth aspect, alone or in combination with one or more of the first through third aspects, process 800 includes receiving the first set of one or more control channel communications, and determining, using the codebook and the one or more codeword powers, a first average receive power associated with a data transmission included in the first set of one or more control channel communications and a second average receive power associated with a reference signal transmission included in the first set of one or more control channel communications, wherein the average TPR is based on the first average receive power and the second average receive power.

In a fifth aspect, alone or in combination with one or more of the first through fourth aspects, transmitting the first information includes transmitting the first information via medium access control signaling.

In a sixth aspect, alone or in combination with one or more of the first through fifth aspects, transmitting the first information includes transmitting one or more MAC-CEs that include the first information.

In a seventh aspect, alone or in combination with one or more of the first through sixth aspects, process 800 includes transmitting, to the second network entity, a request for radio resources, and receiving, from the second network entity, a communication that indicates one or more radio resources available for the first network entity, wherein transmitting the first information includes transmitting the first information via the one or more radio resources.

In an eighth aspect, alone or in combination with one or more of the first through seventh aspects, process 800 includes detecting an event, and transmitting the first information includes transmitting the first information based on the detection of the event.

In a ninth aspect, alone or in combination with one or more of the first through eighth aspects, detecting the event includes determining that the average TPR satisfies a threshold.

In a tenth aspect, alone or in combination with one or more of the first through ninth aspects, determining that the average TPR satisfies the threshold includes determining that the average TPR is greater than or equal to the threshold.

In an eleventh aspect, alone or in combination with one or more of the first through tenth aspects, transmitting the first information includes transmitting the first information via physical layer signaling.

In a twelfth aspect, alone or in combination with one or more of the first through eleventh aspects, transmitting the first information includes transmitting control information that includes the first information.

In a thirteenth aspect, alone or in combination with one or more of the first through twelfth aspects, the control information is included in a DCI communication or a UCI communication.

In a fourteenth aspect, alone or in combination with one or more of the first through thirteenth aspects, transmitting the first information includes transmitting a group-common downlink control information communication that includes the first information.

In a fifteenth aspect, alone or in combination with one or more of the first through fourteenth aspects, the group-common downlink control information communication includes a TPR field, and the TPR field includes the first information.

In a sixteenth aspect, alone or in combination with one or more of the first through fifteenth aspects, the TPR field is only applicable to data included in the second set of one or more control channel communications.

In a seventeenth aspect, alone or in combination with one or more of the first through sixteenth aspects, transmitting the first information includes transmitting a radio resource control communication that includes the first information.

In an eighteenth aspect, alone or in combination with one or more of the first through seventeenth aspects, process 800 includes determining a scaling factor based on the average TPR, and scaling the one or more codeword powers to generate the one or more scaled codeword powers includes scaling, based on the scaling factor, the one or more codeword powers to generate the one or more scaled codeword powers.

In a nineteenth aspect, alone or in combination with one or more of the first through eighteenth aspects, process 800 includes receiving, from the second network entity, an acknowledgement communication that confirms that the first information was successfully received by the second network entity, and scaling the one or more codeword powers to generate the one or more scaled codeword powers includes scaling the one or more codeword powers based on the acknowledgement communication.

In a twentieth aspect, alone or in combination with one or more of the first through nineteenth aspects, communicating the second set of one or more control channel communications includes transmitting, using one or more scaled codeword powers, the second set of one or more control channel communications.

In a twenty-first aspect, alone or in combination with one or more of the first through twentieth aspects, communicating the second set of one or more control channel communications includes receiving, using the one or more scaled codeword powers, the second set of one or more control channel communications.

In a twenty-second aspect, alone or in combination with one or more of the first through twenty-first aspects, the first network entity is a UE and the second network entity is a network node.

In a twenty-third aspect, alone or in combination with one or more of the first through twenty-second aspects, the first network entity is a network node and the second network entity is a UE.

In a twenty-fourth aspect, alone or in combination with one or more of the first through twenty-third aspects, the codebook is associated with a respective dedicated power shaping parameter for each respective codeword included in the codebook, and the one or more scaled codeword powers are based on the average TPR and the respective dedicated power shaping parameter for each respective codeword.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
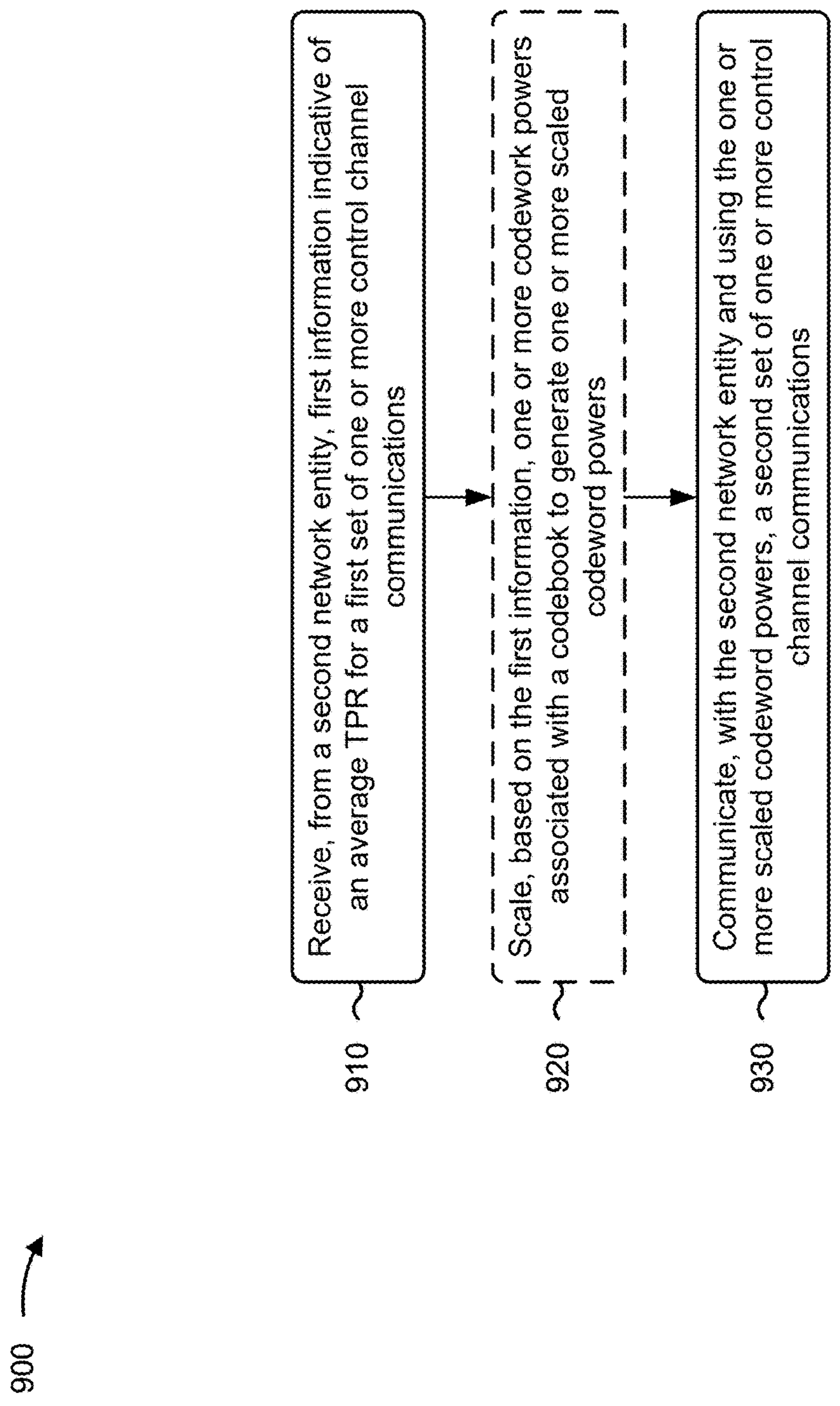
FIG. 9 is a diagram illustrating an example process performed, for example, at a first network entity or an apparatus of a first network entity, in accordance with the present disclosure.

FIG. 9 is a diagram illustrating an example process 900 performed, for example, at a first network entity or an apparatus of a first network entity, in accordance with the present disclosure. Example process 900 is an example where the apparatus or the first network entity (e.g., the network entity 102, the network entity 106, the UE 220, or the network node 210) performs operations associated with TPR signaling for control channels.

As shown in FIG. 9, in some aspects, process 900 may include receiving, from a second network entity, first information indicative of an average TPR for a first set of one or more control channel communications (block 910). For example, the first network entity (e.g., using reception component 1102 and/or communication manager 1106, depicted in FIG. 11) may receive, from a second network entity, first information indicative of an average TPR for a first set of one or more control channel communications, as described above.

As further shown in FIG. 9, in some aspects, process 900 may optionally include scaling, based on the first information, one or more codework powers associated with a codebook to generate one or more scaled codeword powers (block 920). For example, the first network entity (e.g., using communication manager 1106, depicted in FIG. 11) may scale, based on the first information, one or more codework powers associated with a codebook to generate one or more scaled codeword powers, as described above.

As further shown in FIG. 9, in some aspects, process 900 may include communicating, with the second network entity and using the one or more scaled codeword powers, a second set of one or more control channel communications (block 930). For example, the first network entity (e.g., using reception component 1102, transmission component 1104, and/or communication manager 1106, depicted in FIG. 11) may communicate, with the second network entity and using the one or more scaled codeword powers, a second set of one or more control channel communications, as described above.

Process 900 may include additional aspects, such as any single aspect or any combination of aspects described below and/or in connection with one or more other processes described elsewhere herein.

In a first aspect, the average TPR indicates a ratio between a first average transmit power of data included in the first set of one or more control channel communications, and a second average transmit power of a reference signal included in the first set of one or more control channel communications.

In a second aspect, alone or in combination with the first aspect, the one or more codeword powers are associated with power shaping parameters for respective codewords included in the codebook.

In a third aspect, alone or in combination with one or more of the first and second aspects, process 900 includes transmitting, using the codebook and the one or more codeword powers, data, wherein the data is included in the first set of one or more control channel communications, and wherein the average TPR is based on an average receive power of the data.

In a fourth aspect, alone or in combination with one or more of the first through third aspects, receiving the average TPR includes receiving the first information via medium access control signaling.

In a fifth aspect, alone or in combination with one or more of the first through fourth aspects, receiving the average TPR includes receiving one or more MAC-CEs that include the first information.

In a sixth aspect, alone or in combination with one or more of the first through fifth aspects, process 900 includes receiving, from the second network entity, a request for radio resources, and transmitting, to the second network entity, a communication that indicates one or more radio resources available for the first network entity, wherein receiving the first information includes receiving the first information via the one or more radio resources.

In a seventh aspect, alone or in combination with one or more of the first through sixth aspects, receiving the first information includes receiving the first information via physical layer signaling.

In an eighth aspect, alone or in combination with one or more of the first through seventh aspects, receiving the first information includes receiving control information that includes the first information.

In a ninth aspect, alone or in combination with one or more of the first through eighth aspects, the control information is included in a DCI communication or a UCI communication.

In a tenth aspect, alone or in combination with one or more of the first through ninth aspects, receiving the first information includes receiving a group-common downlink control information communication that includes the first information.

In an eleventh aspect, alone or in combination with one or more of the first through tenth aspects, the group-common downlink control information communication includes a TPR field, and the TPR field includes the first information.

In a twelfth aspect, alone or in combination with one or more of the first through eleventh aspects, the TPR field is only applicable to data included in the second set of one or more control channel communications.

In a thirteenth aspect, alone or in combination with one or more of the first through twelfth aspects, receiving the first information includes receiving a radio resource control communication that includes the first information.

In a fourteenth aspect, alone or in combination with one or more of the first through thirteenth aspects, process 900 includes determining a scaling factor based on the average TPR, wherein scaling the one or more codeword powers to generate the one or more scaled codeword powers includes scaling, based on the scaling factor, the one or more codeword powers to generate the one or more scaled codeword powers.

In a fifteenth aspect, alone or in combination with one or more of the first through fourteenth aspects, process 900 includes transmitting, to the second network entity, an acknowledgement communication that confirms that the first information was successfully received by the first network entity, and scaling the one or more codeword powers to generate the one or more scaled codeword powers includes scaling the one or more codeword powers based on the acknowledgement communication.

In a sixteenth aspect, alone or in combination with one or more of the first through fifteenth aspects, communicating the second set of one or more control channel communications includes transmitting, using the one or more scaled codeword powers, the second set of one or more control channel communications.

In a seventeenth aspect, alone or in combination with one or more of the first through sixteenth aspects, communicating with the second set of one or more control channel communications includes receiving, using the one or more scaled codeword powers, the second set of one or more control channel communications.

In an eighteenth aspect, alone or in combination with one or more of the first through seventeenth aspects, the first network entity is a UE and the second network entity is a network node.

In a nineteenth aspect, alone or in combination with one or more of the first through eighteenth aspects, the first network entity is a network node and the second network entity is a UE.

In a twentieth aspect, alone or in combination with one or more of the first through nineteenth aspects, the codebook is associated with a respective dedicated power shaping parameter for each respective codeword included in the codebook.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
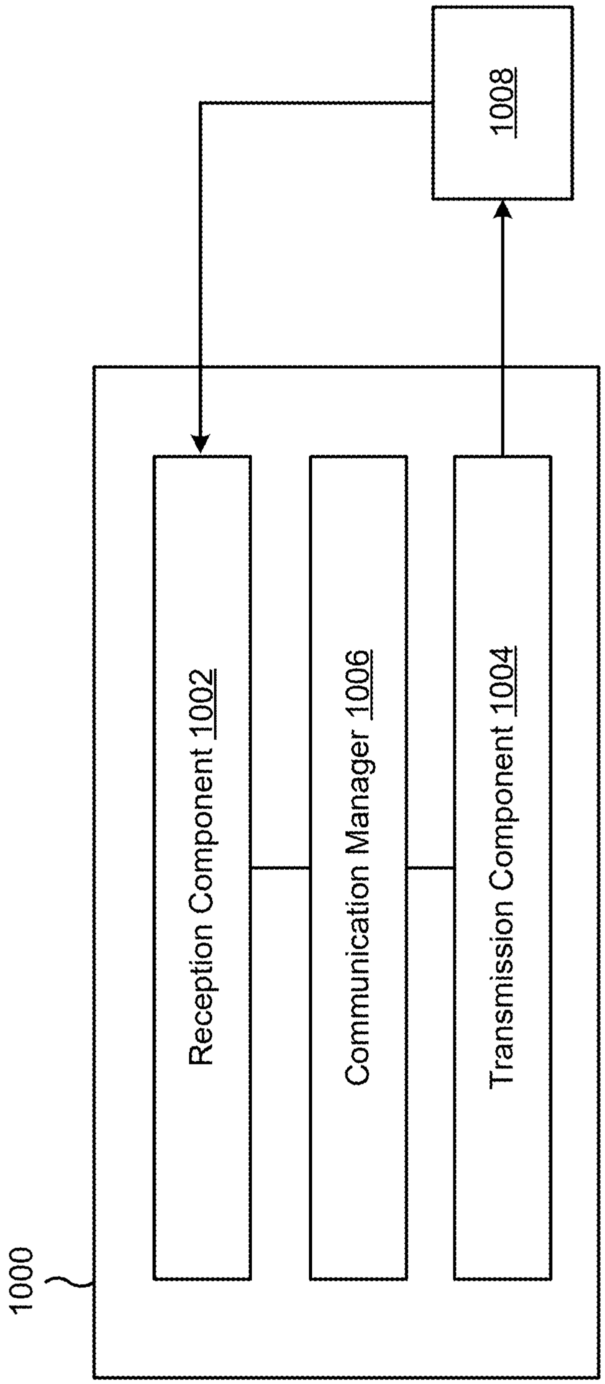
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a first network entity, or a first network entity may include the apparatus 1000. In some aspects, the first network entity may be a UE (e.g., the UE 220). In other aspects, the first network entity may be a network node (e.g., the network node 210). In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is another communication manager described herein, such as the communication manager 114, the communication manager 118, the communication manager 240, or the communication manager 250. As shown, the apparatus 1000 may communicate with another apparatus 1008 (e.g., a second network entity), such as a UE or a network node (such as a CU, a DU, an RU, or a base station), using the reception component 1002 and the transmission component 1004.

In some aspects, the apparatus 1000 may be configured to perform one or more operations described herein in connection with FIG. 7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE or the network node described in connection with FIG. 3. Additionally, or alternatively, one or more components shown in FIG. 10 may be implemented within one or more components described in connection with FIG. 3. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the UE or the network node described in connection with FIG. 3.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the UE or the network node described in connection with FIG. 3. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The transmission component 1004 may transmit, to a second network entity, first information indicative of an average TPR for a first set of one or more control channel communications. The communication manager 1006 may scale, based on the first information, one or more codeword powers associated with a codebook to generate one or more scaled codeword powers. The reception component 1002 and/or the transmission component 1004 may communicate, with the second network entity and using the one or more scaled codeword powers, a second set of one or more control channel communications.

The transmission component 1004 may transmit, using the codebook and the one or more codeword powers, data, wherein the data is included in the one or more control channel communications, and wherein the average TPR is based on an average transmit power of the data.

The reception component 1002 may receive the first set of one or more control channel communications.

The communication manager 1006 may determine, using the codebook and the one or more codeword powers, a first average receive power associated with a data transmission included in the first set of one or more control channel communications and a second average receive power associated with a reference signal transmission included in the first set of one or more control channel communications, wherein the average TPR is based on the first average receive power and the second average receive power.

The transmission component 1004 may transmit, to the second network entity, a request for radio resources.

The reception component 1002 may receive, from the second network entity, a communication that indicates one or more radio resources available for the first network entity, wherein transmitting the first information comprises transmitting the first information via the one or more radio resources.

The communication manager 1006 may detect an event. The communication manager 1006 may determine a scaling factor based on the average TPR. The reception component 1002 may receive, from the second network entity, an acknowledgement communication that confirms that the first information was successfully received by the second network entity.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
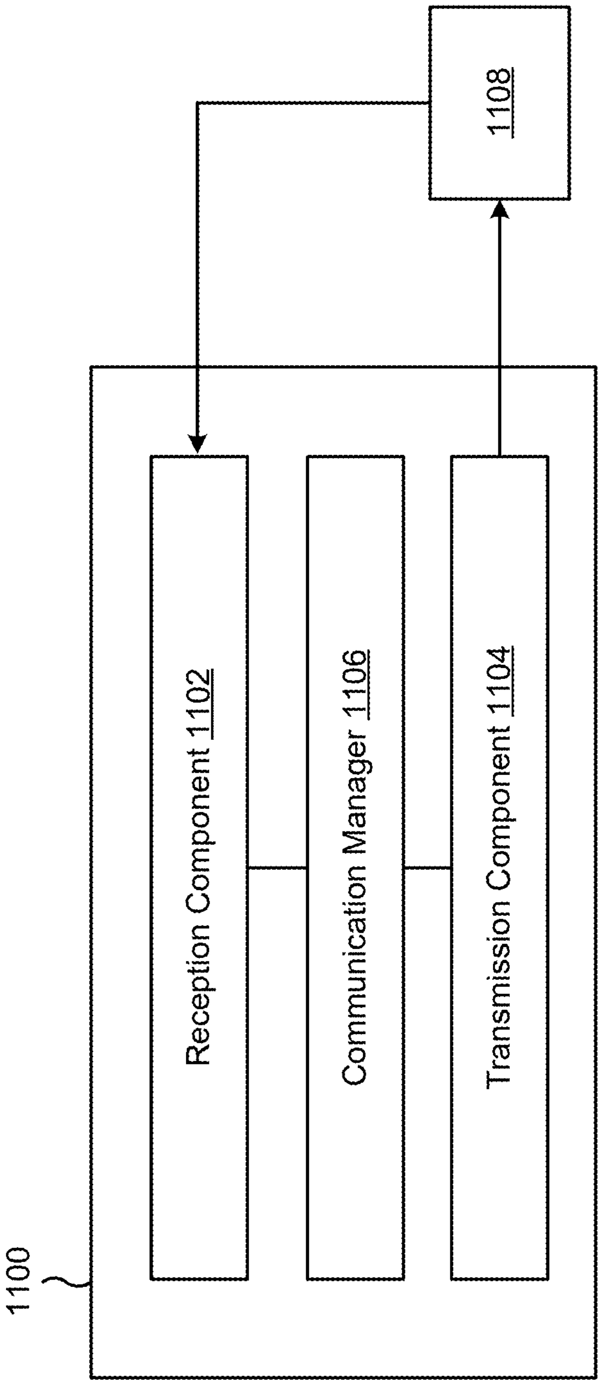
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a first network entity, or a first network entity may include the apparatus 1100. In some aspects, the first network entity may be a UE (e.g., the UE 220). In other aspects, the first network entity may be a network node (e.g., the network node 210). In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is another communication manager described herein, such as the communication manager 114, the communication manager 118, the communication manager 240, or the communication manager 250. As shown, the apparatus 1100 may communicate with another apparatus 1108 (e.g., a second network entity), such as a UE or a network node (such as a CU, a DU, an RU, or a base station), using the reception component 1102 and the transmission component 1104.

In some aspects, the apparatus 1100 may be configured to perform one or more operations described herein in connection with FIG. 7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE or the network node described in connection with FIG. 3. Additionally, or alternatively, one or more components shown in FIG. 11 may be implemented within one or more components described in connection with FIG. 3. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, one or more modems, one or more demodulators, one or more MIMO detectors, one or more receive processors, one or more controllers/processors, one or more memories, or a combination thereof, of the UE or the network node described in connection with FIG. 3.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, one or more modems, one or more modulators, one or more transmit MIMO processors, one or more transmit processors, one or more controllers/processors, one or more memories, or a combination thereof, of the UE or the network node described in connection with FIG. 3. In some aspects, the transmission component 1104 may be co-located with the reception component 1102 in one or more transceivers.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive, from a second network entity, first information indicative of an average TPR for a first set of one or more control channel communications. The communication manager 1106 may scale, based on the first information, one or more codework powers associated with a codebook to generate one or more scaled codeword powers. The reception component 1102 and/or the transmission component 1104 may communicate, with the second network entity and using the one or more scaled codeword powers, a second set of one or more control channel communications.

The transmission component 1104 may transmit, using the codebook and the one or more codeword powers, data, wherein the data is included in the first set of one or more control channel communications, and wherein the average TPR is based on an average receive power of the data. The reception component 1102 may receive, from the second network entity, a request for radio resources.

The transmission component 1104 may transmit, to the second network entity, a communication that indicates one or more radio resources available for the first network entity, wherein receiving the first information comprises receiving the first information via the one or more radio resources.

The communication manager 1106 may determine a scaling factor based on the average TPR, wherein scaling the one or more codeword powers to generate the one or more scaled codeword powers comprises scaling, based on the scaling factor, the one or more codeword powers to generate the one or more scaled codeword powers.

The transmission component 1104 may transmit, to the second network entity, an acknowledgement communication that confirms that the first information was successfully received by the first network entity.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first network entity, comprising: transmitting, to a second network entity, first information indicative of an average traffic-to-pilot ratio (TPR) for a first set of one or more control channel communications; scaling, based on the first information, one or more codeword powers associated with a codebook to generate one or more scaled codeword powers; and communicating, with the second network entity and using the one or more scaled codeword powers, a second set of one or more control channel communications.

Aspect 2: The method of Aspect 1, wherein the average TPR is a ratio between: a first average transmit power of data included in the first set of one or more control channel communications, and a second average transmit power of a reference signal included in the first set of one or more control channel communications.

Aspect 3: The method of any of Aspects 1-2, wherein the one or more codeword powers are associated with power shaping parameters for respective codewords included in the codebook.

Aspect 4: The method of any of Aspects 1-3, further comprising: transmitting, using the codebook and the one or more codeword powers, data, wherein the data is included in the one or more control channel communications, and wherein the average TPR is based on an average transmit power of the data.

Aspect 5: The method of any of Aspects 1-4, further comprising: receiving the first set of one or more control channel communications; and determining, using the codebook and the one or more codeword powers, a first average receive power associated with a data transmission included in the first set of one or more control channel communications and a second average receive power associated with a reference signal transmission included in the first set of one or more control channel communications, wherein the average TPR is based on the first average receive power and the second average receive power.

Aspect 6: The method of any of Aspects 1-5, wherein transmitting the first information comprises: transmitting the first information via medium access control signaling.

Aspect 7: The method of any of Aspects 1-6, wherein transmitting the first information comprises: transmitting one or more medium access control (MAC) control elements (MAC-CEs) that include the first information.

Aspect 8: The method of any of Aspects 1-7, further comprising: transmitting, to the second network entity, a request for radio resources; and receiving, from the second network entity, a communication that indicates one or more radio resources available for the first network entity, wherein transmitting the first information comprises transmitting the first information via the one or more radio resources.

Aspect 9: The method of any of Aspects 1-8, further comprising: detecting an event; and wherein transmitting the first information comprises: transmitting the first information based on the detection of the event. wherein transmitting the first information comprises: transmitting the first information based on the detection of the event.

Aspect 10: The method of Aspect 9, wherein detecting the event comprises: determining that the average TPR satisfies a threshold.

Aspect 11: The method of Aspect 10, wherein determining that the average TPR satisfies the threshold comprises: determining that the average TPR is greater than or equal to the threshold.

Aspect 12: The method of any of Aspects 1-11, wherein transmitting the first information comprises: transmitting the first information via physical layer signaling.

Aspect 13: The method of any of Aspects 1-12, wherein transmitting the first information comprises: transmitting control information that includes the first information.

Aspect 14: The method of Aspect 13, wherein the control information is included in a downlink control information (DCI) communication or an uplink control information (UCI) communication.

Aspect 15: The method of any of Aspects 1-14, wherein transmitting the first information comprises: transmitting a group-common downlink control information communication that includes the first information.

Aspect 16: The method of Aspect 15, wherein the group-common downlink control information communication includes a TPR field, and wherein the TPR field includes the first information.

Aspect 17: The method of Aspect 16, wherein the TPR field is only applicable to data included in the second set of one or more control channel communications.

Aspect 18: The method of any of Aspects 1-17, wherein transmitting the first information comprises: transmitting a radio resource control communication that includes the first information.

Aspect 19: The method of any of Aspects 1-18, further comprising: determining a scaling factor based on the average TPR; and wherein scaling the one or more codeword powers to generate the one or more scaled codeword powers comprises: scaling, based on the scaling factor, the one or more codeword powers to generate the one or more scaled codeword powers. wherein scaling the one or more codeword powers to generate the one or more scaled codeword powers comprises: scaling, based on the scaling factor, the one or more codeword powers to generate the one or more scaled codeword powers.

Aspect 20: The method of any of Aspects 1-19, further comprising: receiving, from the second network entity, an acknowledgement communication that confirms that the first information was successfully received by the second network entity; and wherein scaling the one or more codeword powers to generate the one or more scaled codeword powers comprises: scaling the one or more codeword powers based on the acknowledgement communication, wherein scaling the one or more codeword powers to generate the one or more scaled codeword powers comprises: scaling the one or more codeword powers based on the acknowledgement communication.

Aspect 21: The method of any of Aspects 1-20, wherein communicating the second set of one or more control channel communications comprises: transmitting, using one or more scaled codeword powers, the second set of one or more control channel communications.

Aspect 22: The method of any of Aspects 1-21, wherein communicating the second set of one or more control channel communications comprises: receiving, using the one or more scaled codeword powers, the second set of one or more control channel communications.

Aspect 23: The method of any of Aspects 1-22, wherein the first network entity is a user equipment and the second network entity is a network node.

Aspect 24: The method of any of Aspects 1-23, wherein the first network entity is a network node and the second network entity is a user equipment.

Aspect 25: The method of any of Aspects 1-24, wherein the codebook is associated with a respective dedicated power shaping parameter for each respective codeword included in the codebook, and wherein the one or more scaled codeword powers are based on the average TPR and the respective dedicated power shaping parameter for each respective codeword.

Aspect 26: A method of wireless communication performed by a first network entity, comprising: receiving, from a second network entity, first information indicative of an average traffic-to-pilot ratio (TPR) for a first set of one or more control channel communications; scaling, based on the first information, one or more codework powers associated with a codebook to generate one or more scaled codeword powers; and communicating, with the second network entity and using the one or more scaled codeword powers, a second set of one or more control channel communications.

Aspect 27: The method of Aspect 26, wherein the average TPR indicates a ratio between: a first average transmit power of data included in the first set of one or more control channel communications, and a second average transmit power of a reference signal included in the first set of one or more control channel communications.

Aspect 28: The method of any of Aspects 26-27, wherein the one or more codeword powers are associated with power shaping parameters for respective codewords included in the codebook.

Aspect 29: The method of any of Aspects 26-28, further comprising: transmitting, using the codebook and the one or more codeword powers, data, wherein the data is included in the first set of one or more control channel communications, and wherein the average TPR is based on an average receive power of the data.

Aspect 30: The method of any of Aspects 26-29, wherein receiving the average TPR comprises: receiving the first information via medium access control signaling.

Aspect 31: The method of any of Aspects 26-30, wherein receiving the average TPR comprises: receiving one or more medium access control (MAC) control elements (MAC-CEs) that include the first information.

Aspect 32: The method of any of Aspects 26-31, further comprising: receiving, from the second network entity, a request for radio resources; and transmitting, to the second network entity, a communication that indicates one or more radio resources available for the first network entity, wherein receiving the first information comprises: receiving the first information via the one or more radio resources.

Aspect 33: The method of any of Aspects 26-32, wherein receiving the first information comprises: receiving the first information via physical layer signaling.

Aspect 34: The method of any of Aspects 26-33, wherein receiving the first information comprises: receiving control information that includes the first information.

Aspect 35: The method of Aspect 34, wherein the control information is included in a downlink control information (DCI) communication or an uplink control information (UCI) communication.

Aspect 36: The method of any of Aspects 26-35, wherein receiving the first information comprises: receiving a group-common downlink control information communication that includes the first information.

Aspect 37: The method of Aspect 36, wherein the group-common downlink control information communication includes a TPR field, and wherein the TPR field includes the first information.

Aspect 38: The method of Aspect 37, wherein the TPR field is only applicable to data included in the second set of one or more control channel communications.

Aspect 39: The method of any of Aspects 26-38, wherein receiving the first information comprises: receiving a radio resource control communication that includes the first information.

Aspect 40: The method of any of Aspects 26-39, further comprising: determining a scaling factor based on the average TPR, wherein scaling the one or more codeword powers to generate the one or more scaled codeword powers comprises: scaling, based on the scaling factor, the one or more codeword powers to generate the one or more scaled codeword powers.

Aspect 41: The method of any of Aspects 26-40, further comprising: transmitting, to the second network entity, an acknowledgement communication that confirms that the first information was successfully received by the first network entity; and wherein scaling the one or more codeword powers to generate the one or more scaled codeword powers comprises: scaling the one or more codeword powers based on the acknowledgement communication, wherein scaling the one or more codeword powers to generate the one or more scaled codeword powers comprises: scaling the one or more codeword powers based on the acknowledgement communication.

Aspect 42: The method of any of Aspects 26-41, wherein communicating the second set of one or more control channel communications comprises: transmitting, using the one or more scaled codeword powers, the second set of one or more control channel communications.

Aspect 43: The method of any of Aspects 26-42, wherein communicating with the second set of one or more control channel communications comprises: receiving, using the one or more scaled codeword powers, the second set of one or more control channel communications.

Aspect 44: The method of any of Aspects 26-43, wherein the first network entity is a user equipment and the second network entity is a network node.

Aspect 45: The method of any of Aspects 26-44, wherein the first network entity is a network node and the second network entity is a user equipment.

Aspect 46: The method of any of Aspects 26-45, wherein the codebook is associated with a respective dedicated power shaping parameter for each respective codeword included in the codebook.

Aspect 47: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-46.

Aspect 48: An apparatus for wireless communication at a device, the apparatus comprising one or more memories and one or more processors coupled to the one or more memories, the one or more processors configured to cause the device to perform the method of one or more of Aspects 1-46.

Aspect 49: An apparatus for wireless communication, the apparatus comprising at least one means for performing the method of one or more of Aspects 1-46.

Aspect 50: A non-transitory computer-readable medium storing code for wireless communication, the code comprising instructions executable by one or more processors to perform the method of one or more of Aspects 1-46.

Aspect 51: A non-transitory computer-readable medium storing a set of instructions for wireless communication, the set of instructions comprising one or more instructions that, when executed by one or more processors of a device, cause the device to perform the method of one or more of Aspects 1-46.

Aspect 52: A device for wireless communication, the device comprising a processing system that includes one or more processors and one or more memories coupled with the one or more processors, the processing system configured to cause the device to perform the method of one or more of Aspects 1-46.

Aspect 53: An apparatus for wireless communication at a device, the apparatus comprising one or more memories and one or more processors coupled to the one or more memories, the one or more processors individually or collectively configured to cause the device to perform the method of one or more of Aspects 1-46.

The foregoing disclosure provides illustration and description but is neither exhaustive nor limiting of the scope of this disclosure. For example, various aspects and examples are disclosed herein, but this disclosure is not limited to the precise form in which such aspects and examples are described. Modifications and variations may be made in light of the above disclosure or may be acquired from practice of the aspects.

As used herein, the term "component" shall be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. Systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and/or measuring, among other examples. Also, "determining" can include receiving (such as receiving information), accessing (such as accessing data stored in memory), and/or transmitting (such as transmitting information), among other examples. As another example, “determining” can include resolving, selecting, obtaining, choosing, establishing, and/or other such similar actions.

Even though particular combinations of features are recited in the claims and/or disclosed in the specification, these combinations do not limit the scope of the disclosure. Many of these features may be combined in ways not specifically recited in the claims and/or disclosed in the specification. The disclosure of various aspects includes each dependent claim in combination with every other claim in the claim set. As used herein, a phrase referring to “at least one of” a list of items refers to any combination of those items, including single members. As used herein, a phrase referring to “at least one of” a list of items refers to any combination of those items, including single members. As an example, “at least one of: a, b, or c” covers a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles “a” and “an” include one or more items and may be used interchangeably with “one or more.” Further, as used herein, the article “the” may include one or more items referenced in connection with the article “the” and may be used interchangeably with “the one or more.” Furthermore, as used herein, the terms “set” and “group” may include one or more items and may be used interchangeably with “one or more.” Where only one item is intended, the phrase “only one” or similar language is used. Also, as used herein, the terms “has,” “have,” “having,” and similar terms are open-ended terms that do not limit an element that they modify (for example, an element “having” A may also have B). Further, the phrase “based on” means “based on or otherwise in association with” unless explicitly stated otherwise. Also, as used herein, the term “or” is inclusive when used in a series and may be used interchangeably with “and/or,” unless explicitly stated otherwise (for example, if used in combination with “either” or “only one of”). Further, “one or more” may be equivalent to “at least one.”

Even though particular combinations of features are recited in the claims or disclosed in the specification, these combinations are not limiting of the disclosure of various aspects. Many of these features may be combined in ways not specifically recited in the claims or disclosed in the specification. The disclosure of various aspects includes each dependent claim in combination with every other claim in the claim set.

What is claimed is:

1. A first network entity, comprising:

a processing system configured to:

transmit, to a second network entity, first information indicative of an average traffic-to-pilot ratio (TPR) for a first set of one or more control channel communications;

scale, based on the first information, one or more codeword powers associated with a codebook to generate one or more scaled codeword powers; and communicate, with the second network entity and using the one or more scaled codeword powers, a second set of one or more control channel communications.

2. The first network entity of claim 1, wherein the average TPR is a ratio between:

a first average transmit power of data included in the first set of one or more control channel communications, and a second average transmit power of a reference signal included in the first set of one or more control channel communications.

3. The first network entity of claim 1, wherein the one or more codeword powers are associated with power shaping parameters for respective codewords included in the codebook.

4. The first network entity of claim 1, wherein the processing system is configured to:

transmit, using the codebook and the one or more codeword powers, data, wherein the data is included in the one or more control channel communications, and wherein the average TPR is based on an average transmit power of the data.

5. The first network entity of claim 1, wherein the processing system is configured to:

receive the first set of one or more control channel communications; and determine, using the codebook and the one or more codeword powers, a first average receive power associated with a data transmission included in the first set of one or more control channel communications and a second average receive power associated with a reference signal transmission included in the first set of one or more control channel communications, wherein the average TPR is based on the first average receive power and the second average receive power.

6. The first network entity of claim 1, wherein the processing system, to transmit the first information, is configured to:

transmit the first information via medium access control signaling.

7. The first network entity of claim 1, wherein the processing system is configured to:

transmit, to the second network entity, a request for radio resources; and receive, from the second network entity, a communication that indicates one or more radio resources available for the first network entity, wherein the processing system, to transmit the first information, is configured to transmit the first information via the one or more radio resources.

8. The first network entity of claim 1, wherein the processing system is configured to:

detect an event; and wherein the processing system, to transmit the first information, is configured to:

transmit the first information based on the detection of the event.

9. The first network entity of claim 1, wherein the processing system, to transmit the first information, is configured to:

transmit control information that includes the first information.

10. The first network entity of claim 1, wherein the processing system, to transmit the first information, is configured to:

transmit a group-common downlink control information communication that includes the first information.

11. The first network entity of claim 10, wherein the group-common downlink control information communication includes a TPR field, and wherein the TPR field includes the first information.

12. The first network entity of claim 1, wherein the processing system, to transmit the first information, is configured to:

transmit a radio resource control communication that includes the first information.

13. The first network entity of claim 1, wherein the processing system is configured to:

determine a scaling factor based on the average TPR; and wherein the processing system, to scale the one or more codeword powers to generate the one or more scaled codeword powers, is configured to:

scale, based on the scaling factor, the one or more codeword powers to generate the one or more scaled codeword powers.

14. The first network entity of claim 1, wherein the processing system is configured to:

receive, from the second network entity, an acknowledgement communication that confirms that the first information was successfully received by the second network entity; and wherein the processing system, to scale the one or more codeword powers to generate the one or more scaled codeword powers, is configured to:

scale the one or more codeword powers based on the acknowledgement communication.

15. A first network entity for wireless communication, comprising:

a processing system configured to:

receive, from a second network entity, first information indicative of an average traffic-to-pilot ratio (TPR) for a first set of one or more control channel communications;

scale, based on the first information, one or more codework powers associated with a codebook to generate one or more scaled codeword powers; and communicate, with the second network entity and using the one or more scaled codeword powers, a second set of one or more control channel communications.

16. The first network entity of claim 15, wherein the processing system is configured to:

transmit, using the codebook and the one or more codeword powers, data, wherein the data is included in the first set of one or more control channel communications, and wherein the average TPR is based on an average receive power of the data.

17. The first network entity of claim 15, wherein the processing system, to receive the first information, is configured to:

receive a group-common downlink control information communication that includes the first information.

18. The first network entity of claim 17, wherein the group-common downlink control information communication includes a TPR field, and wherein the TPR field includes the first information, and wherein the TPR field is only applicable to data included in the second set of one or more control channel communications.

19. The first network entity of claim 15, wherein the processing system is configured to:

determine a scaling factor based on the average TPR, wherein the processing system, to scale the one or more codeword powers to generate the one or more scaled codeword powers, is configured to:

scale, based on the scaling factor, the one or more codeword powers to generate the one or more scaled codeword powers.

20. The first network entity of claim 15, wherein the processing system is configured to:

transmit, to the second network entity, an acknowledgement communication that confirms that the first information was successfully received by the first network entity; and wherein the processing system, to scale the one or more codeword powers to generate the one or more scaled codeword powers, is configured to:

scale the one or more codeword powers based on the acknowledgement communication.

21. A method of wireless communication performed by a first network entity, comprising:

transmitting, to a second network entity, first information indicative of an average traffic-to-pilot ratio (TPR) for a first set of one or more control channel communications;

scaling, based on the first information, one or more codeword powers associated with a codebook to generate one or more scaled codeword powers; and communicating, with the second network entity and using the one or more scaled codeword powers, a second set of one or more control channel communications.

22. The method of claim 21, wherein the average TPR is a ratio between:

a first average transmit power of data included in the first set of one or more control channel communications, and a second average transmit power of a reference signal included in the first set of one or more control channel communications.

23. The method of claim 21, further comprising:

transmitting, using the codebook and the one or more codeword powers, data, wherein the data is included in the one or more control channel communications, and wherein the average TPR is based on an average transmit power of the data.

24. The method of claim 21, further comprising:

receiving the first set of one or more control channel communications; and determining, using the codebook and the one or more codeword powers, a first average receive power associated with a data transmission included in the first set of one or more control channel communications and a second average receive power associated with a reference signal transmission included in the first set of one or more control channel communications, wherein the average TPR is based on the first average receive power and the second average receive power.

25. The method of claim 21, further comprising:

transmitting, to the second network entity, a request for radio resources; and receiving, from the second network entity, a communication that indicates one or more radio resources available for the first network entity, wherein transmitting the first information comprises transmitting the first information via the one or more radio resources.

26. The method of claim 21, further comprising:

detecting an event; and wherein transmitting the first information comprises:

transmitting the first information based on the detection of the event.

27. The method of claim 21, further comprising:

receiving, from the second network entity, an acknowledgement communication that confirms that the first information was successfully received by the second network entity; and wherein scaling the one or more codeword powers to generate the one or more scaled codeword powers comprises:

scaling the one or more codeword powers based on the acknowledgement communication.

28. A method of wireless communication performed by a first network entity, comprising:

receiving, from a second network entity, first information indicative of an average traffic-to-pilot ratio (TPR) for a first set of one or more control channel communications;

scaling, based on the first information, one or more codework powers associated with a codebook to generate one or more scaled codeword powers; and communicating, with the second network entity and using the one or more scaled codeword powers, a second set of one or more control channel communications.

29. The method of claim 28, further comprising:

transmitting, using the codebook and the one or more codeword powers, data, wherein the data is included in the first set of one or more control channel communications, and wherein the average TPR is based on an average receive power of the data.

30. The method of claim 28, further comprising:

receiving, from the second network entity, a request for radio resources; and transmitting, to the second network entity, a communication that indicates one or more radio resources available for the first network entity, wherein receiving the first information comprises:

receiving the first information via the one or more radio resources.

* * * * *